Aug. 1, 1933.   R. L. MULLER   1,920,477
MULTIPLE REGISTER CALCULATING MACHINE
Filed Oct. 2, 1930   12 Sheets-Sheet 4

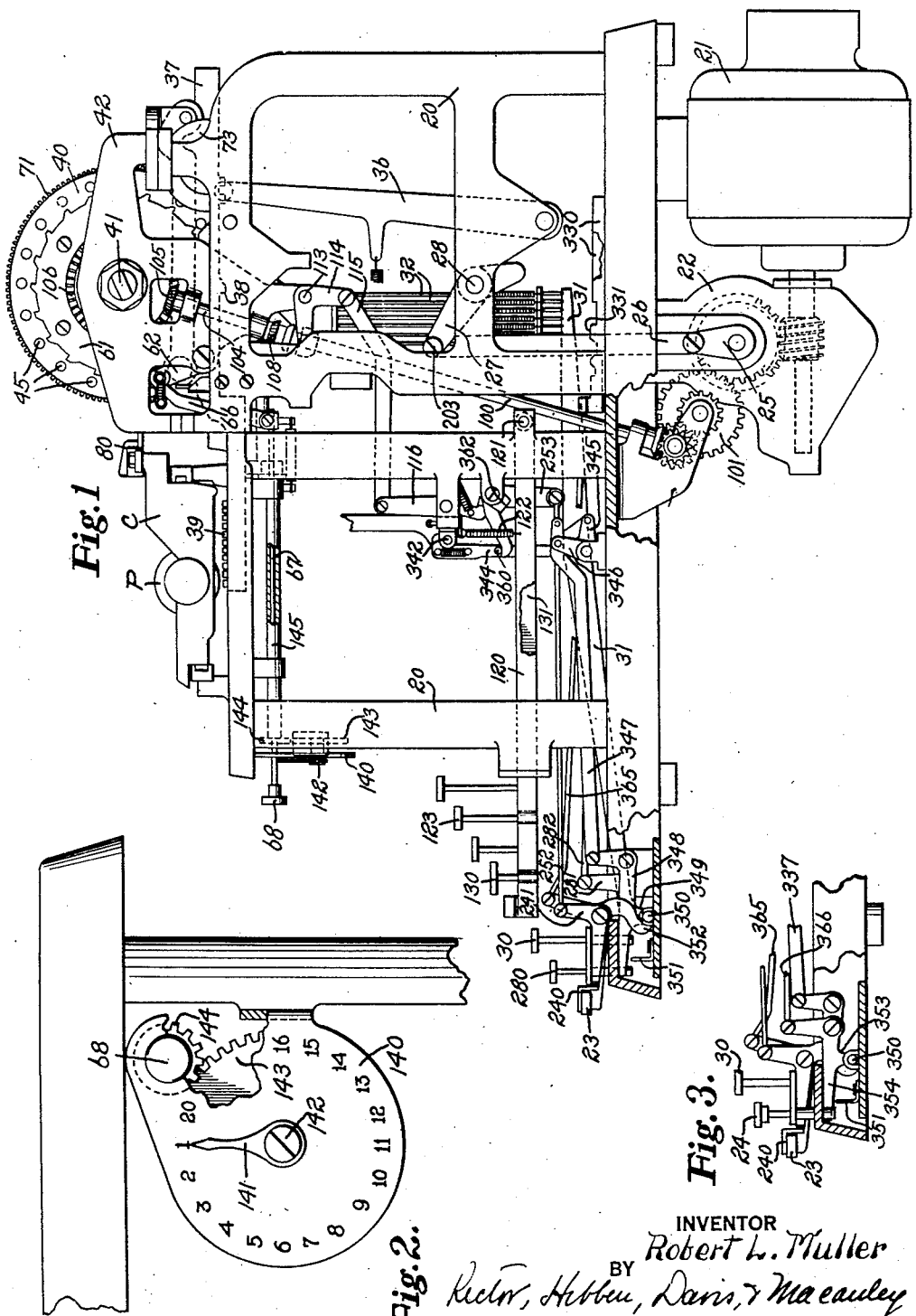

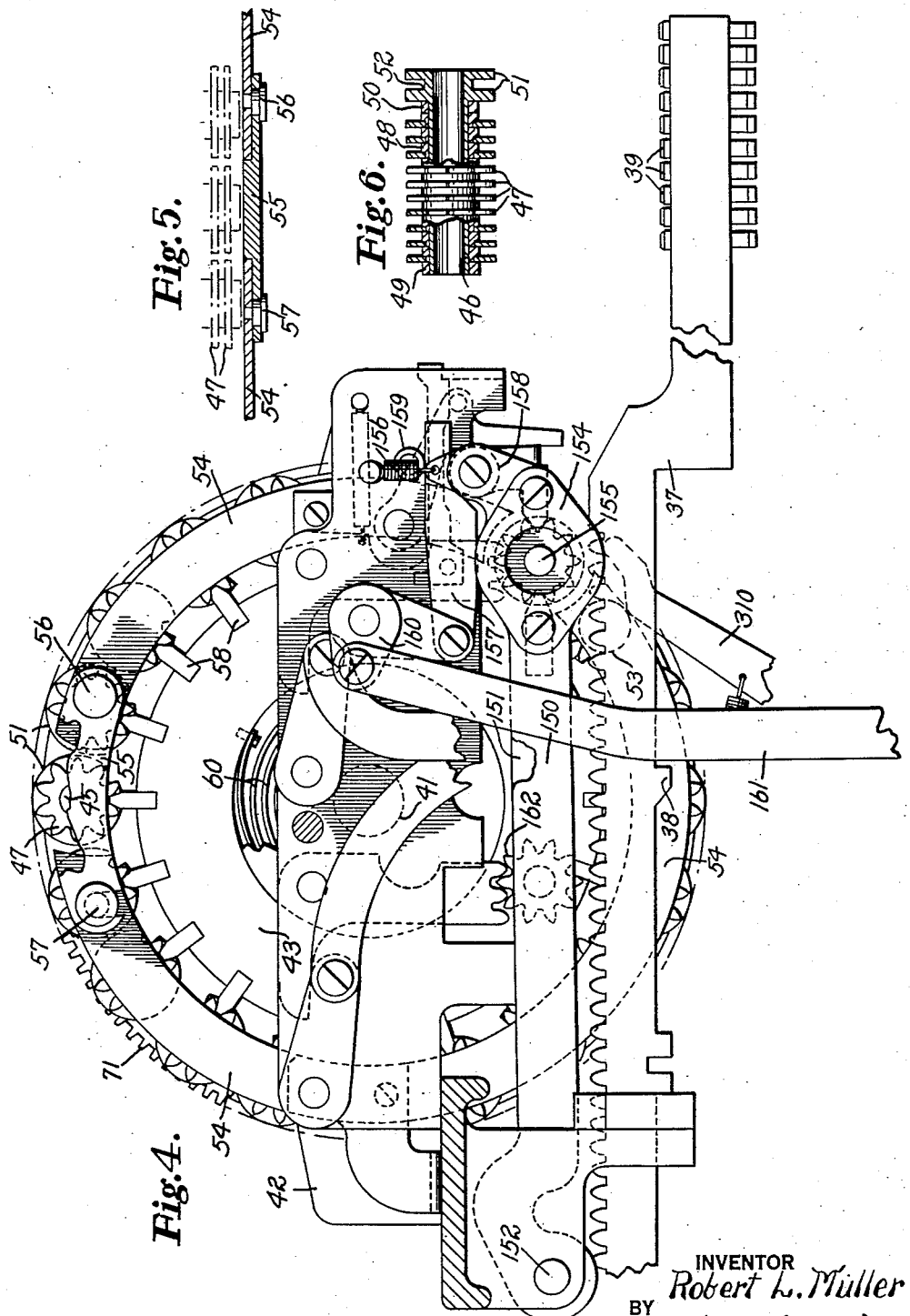

INVENTOR
Robert L. Muller
BY
Rector, Hibben, Davis & Macauley
ATTORNEYS

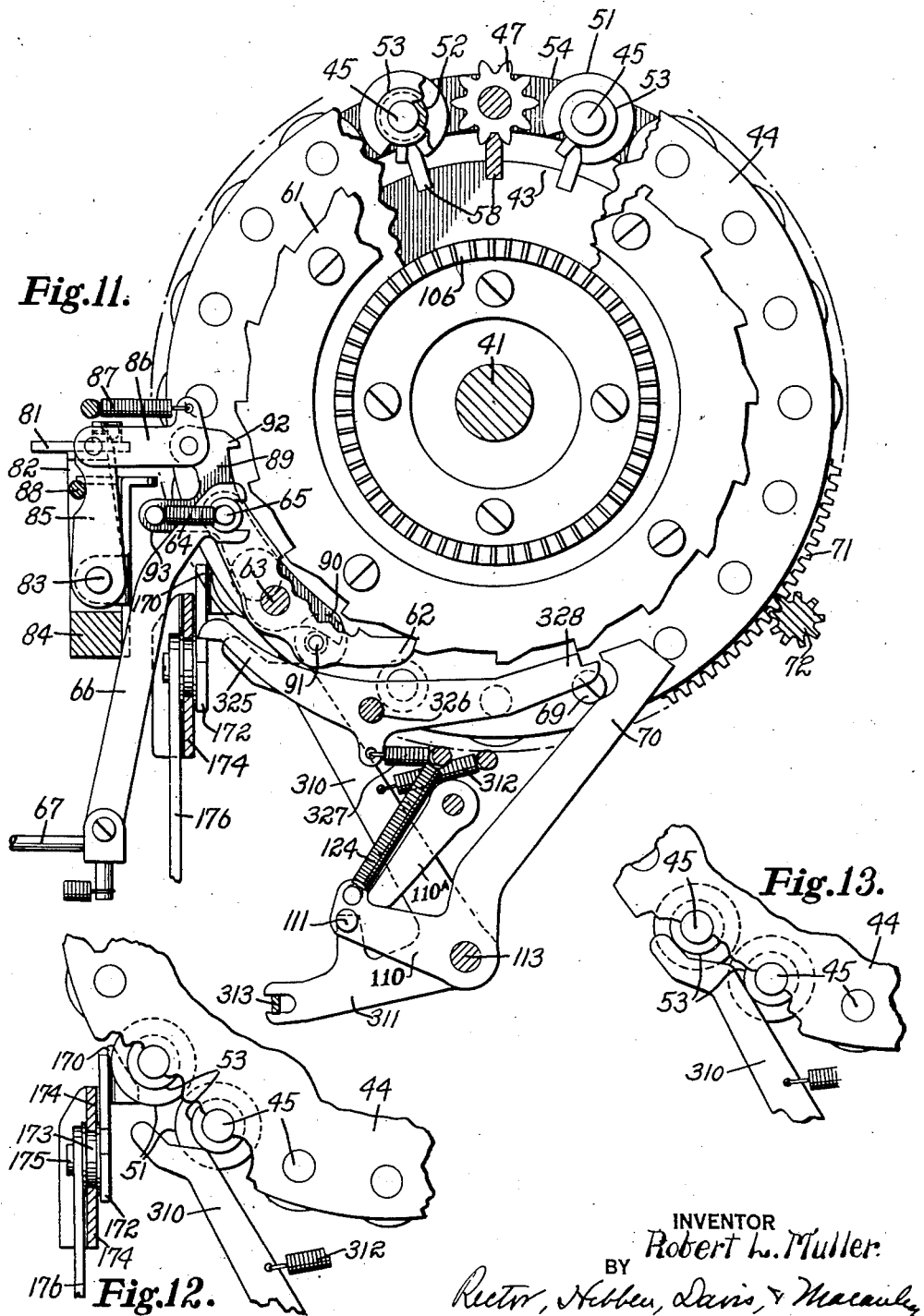

Aug. 1, 1933.   R. L. MULLER   1,920,477
MULTIPLE REGISTER CALCULATING MACHINE
Filed Oct. 2, 1930   12 Sheets-Sheet 6

INVENTOR
Robert L. Muller
BY
ATTORNEYS

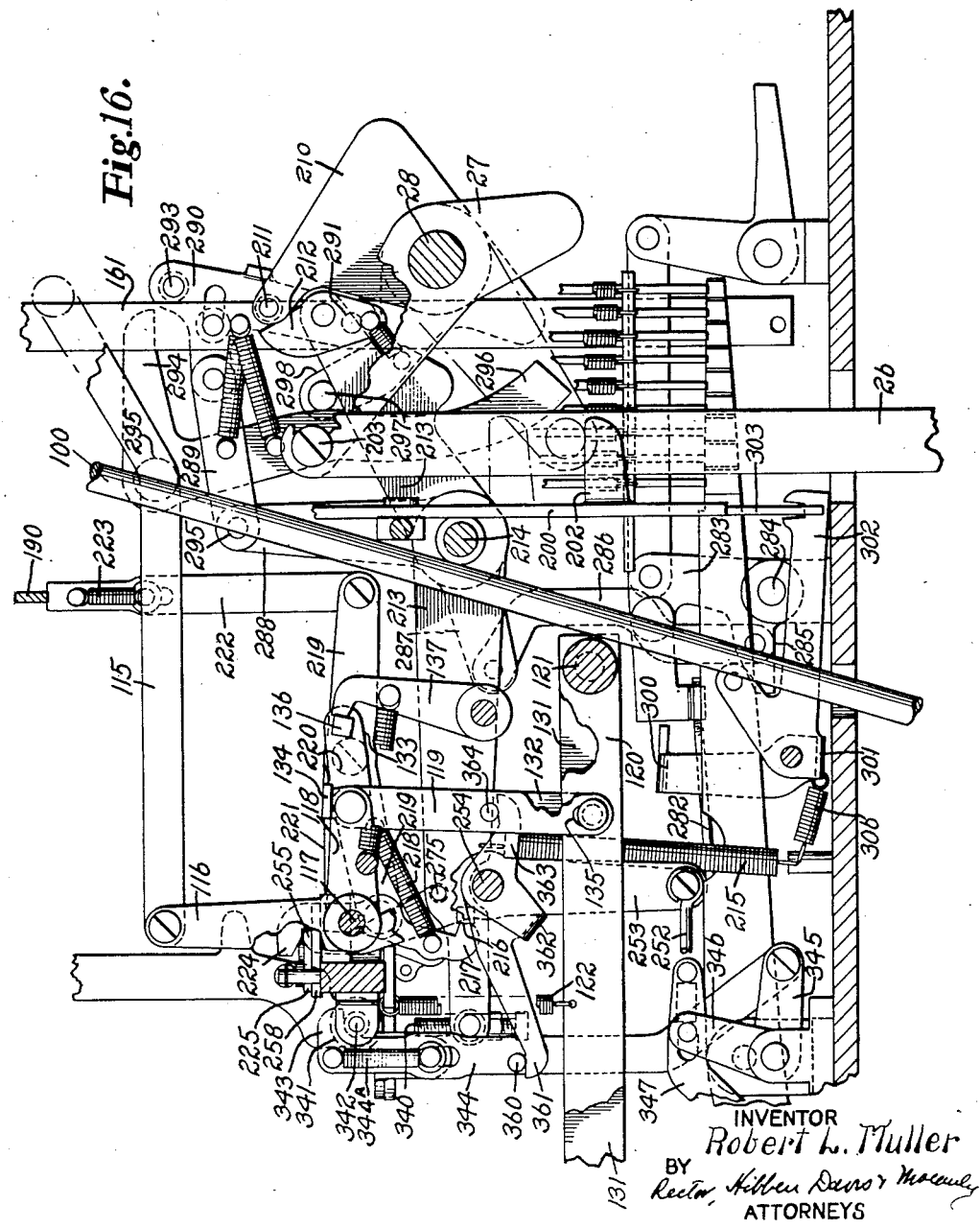

Aug. 1, 1933.   R. L. MULLER   1,920,477
MULTIPLE REGISTER CALCULATING MACHINE
Filed Oct. 2, 1930   12 Sheets-Sheet 9
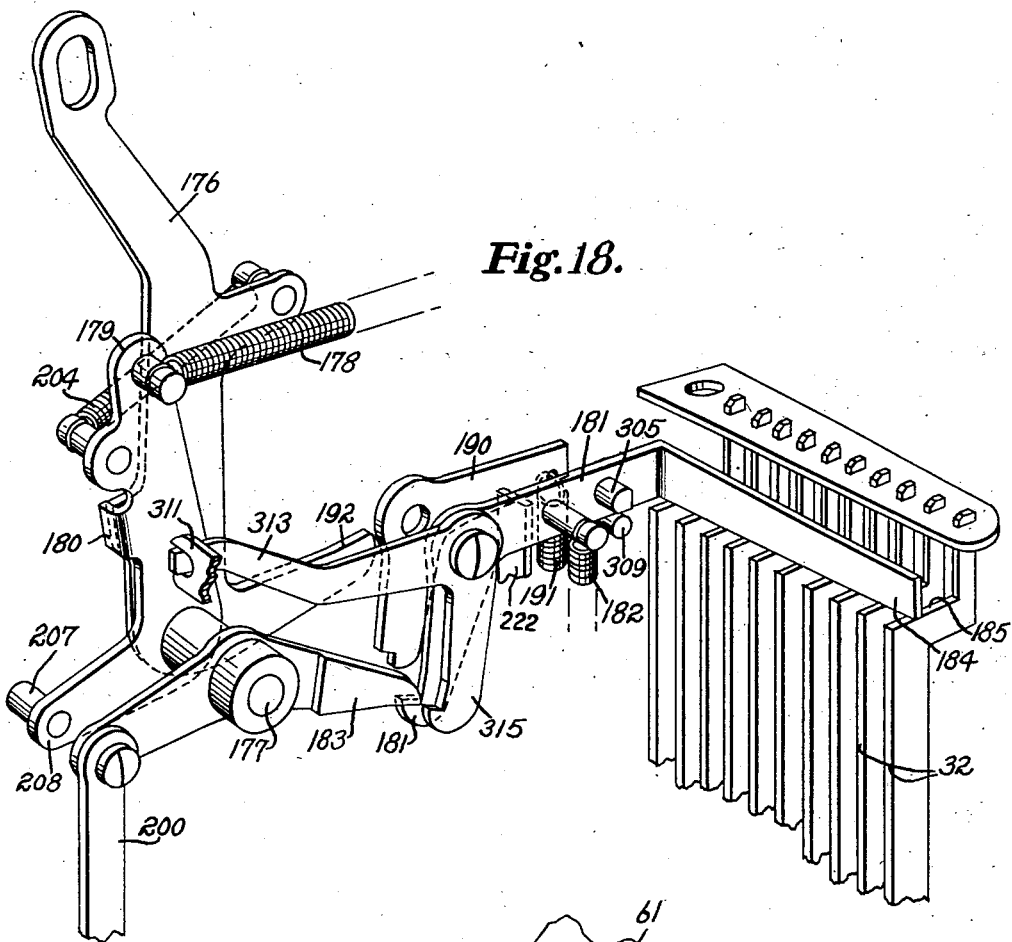
Fig. 18.
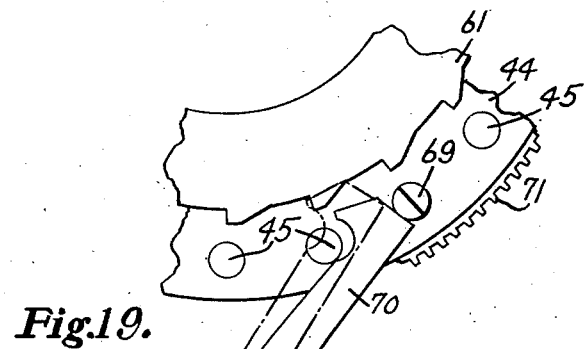
Fig. 19.
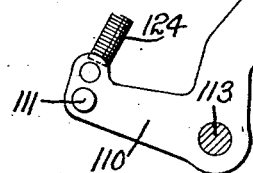
INVENTOR
Robert L. Muller
BY
Rector, Hibben, Davis, & Macauley
ATTORNEYS

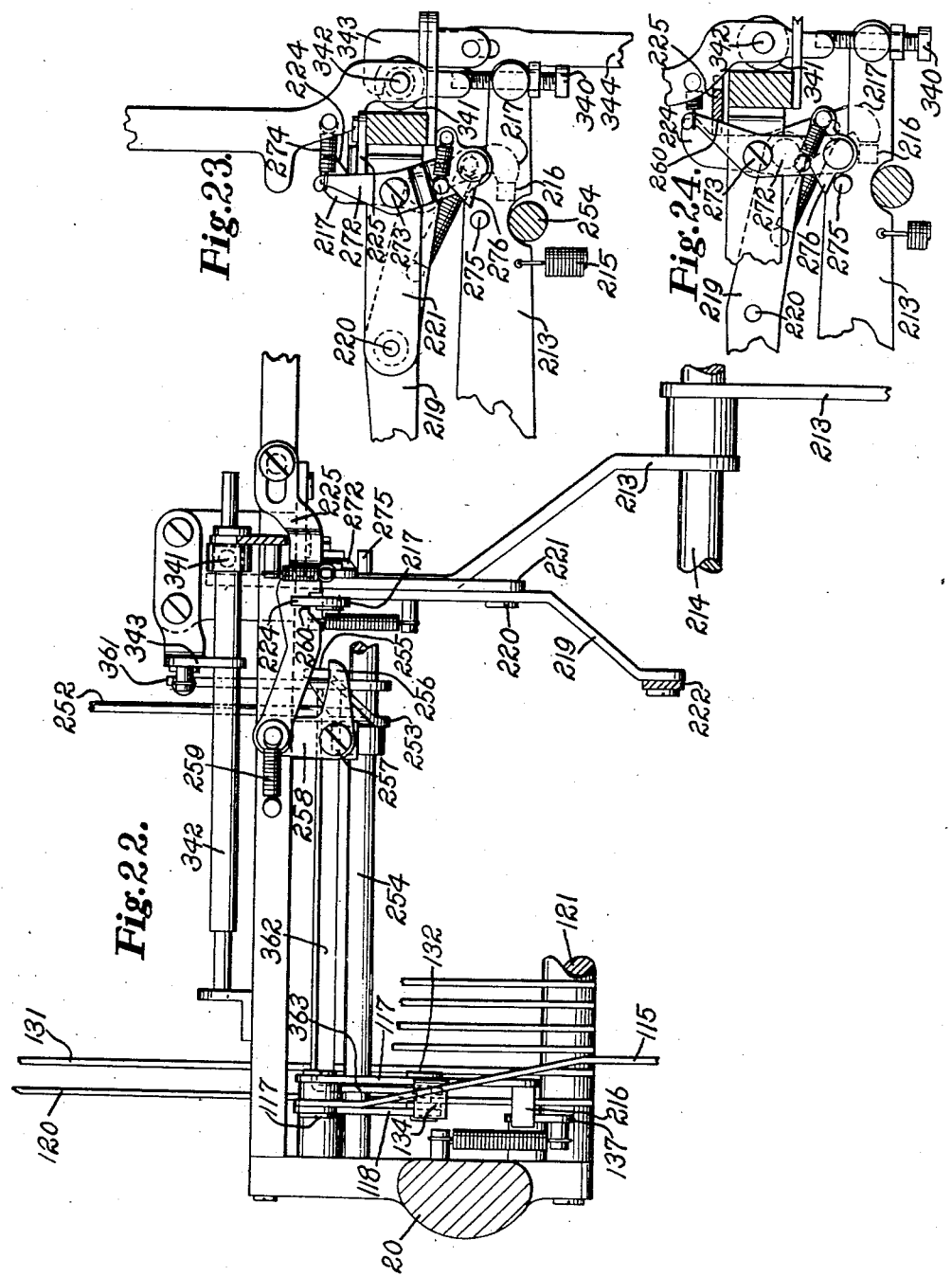

Patented Aug. 1, 1933

1,920,477

UNITED STATES PATENT OFFICE 1,920,477

MULTIPLE REGISTER CALCULATING MACHINE

Robert L. Muller, Detroit, Mich., assignor to Burroughs Adding Machine Company, Detroit, Mich., a Corporation of Michigan Application October 2, 1930. Serial No. 485,890

42 Claims. (Cl. 235—60)

This invention relates to a multiple register calculating machine of the type in which the registers are carried in a rotary magazine or reel.

In most prior machines of this type, it has been customary to move the entire magazine or reel to move the indexed register into and out of engagement with the actuator racks. Carroll 703,639 shows a machine of this kind. This type of construction is cumbersome and unsatisfactory particularly where the reel contains a large number of registers, for example, twenty or thirty. There is so much weight to be moved that it is difficult to get the parts to operate satisfactorily. Another type of machine, of which Carroll 1,006,356, is an example, moves the actuator racks relative to the magazine to engage the indexed register. This construction is also unsatisfactory. In still other machines, such as shown in Carroll 1,202,800 the indexed register is moved slightly relative to the reel, but the construction is such that the machine is complicated and too liable to get out of order.

The present invention contemplates a construction in which, after the register magazine is indexed, which indexing may be accomplished under the control of a key or a paper carriage, the indexed register is automatically and completely removed from the magazine in order to cause it to operatively engage the actuator racks. In the construction shown the register is removed laterally from the magazine and placed in an operating frame that is controlled so as to move the register into and out of engagement with the actuator racks to perform the desired calculating function. After the desired functions have been performed the register is automatically returned to the magazine.

The general object of the invention is to provide an improved multiple register calculating machine.

A more particular object is to provide an improved multiple register machine in which the registers are selectively removed from the register magazine for cooperation with the actuator racks and automatically returned after the desired functions have been performed.

A further object is to provide an improved multiple register machine of the rotatable magazine type in which improved mechanism is provided for indexing the reel.

Other objects and advantages of the invention will appear from the following specification and drawings.

An embodiment of the invention is shown in the accompanying drawings in which:—

Figure 1 is a right side elevation and partial section of a machine with the invention applied thereto;

Fig. 2 is a partial front elevation of the indicator for indicating which register is in indexed position;

Fig. 3 is a partial side elevation and section of some of the controls at the front of the machine;

Fig. 4 is a partial left side elevation of the upper rear portion of the machine showing the register magazine and some of the associated parts;

Fig. 5 is a detail section of a part of the register magazine;

Fig. 6 is a detailed side elevation and section of one of the registers;

Fig. 11 is a right side elevation of the register magazine illustrating particularly the escapement mechanism for controlling it;

Figs. 12 and 13 are detail views showing a portion of the interlocking mechanism for preventing a register from being moved out of the magazine when the latter is not in an indexed position;

Fig. 16 is a right side elevation and section of the lower rear portion of the machine showing some of the operating and controlling connections for the magazine. This view fits immediately below Fig. 14 to make a larger complete view. Some of the parts have been omitted for clearance.

Figure 17:
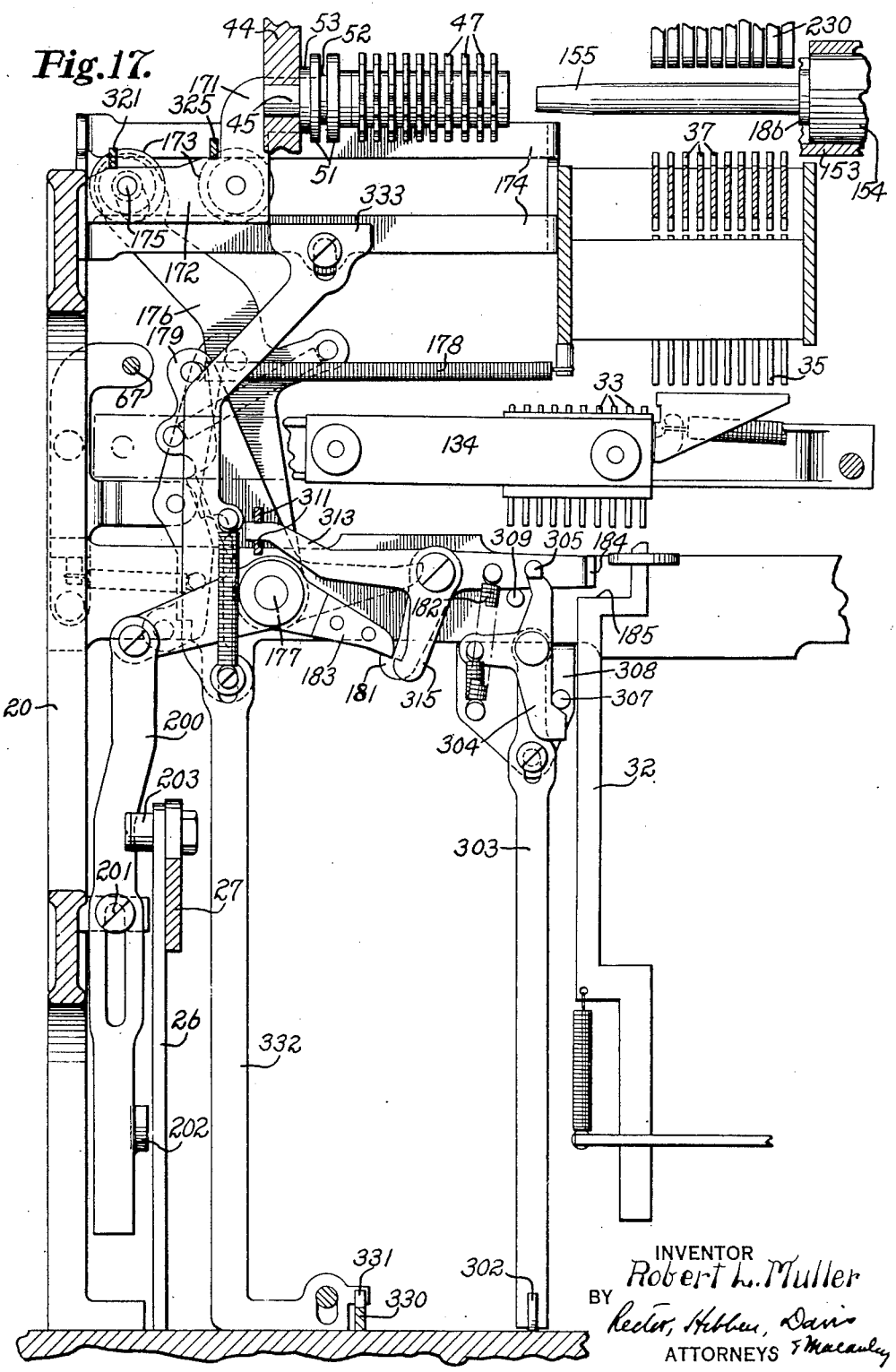

Fig. 17 is a partial rear elevation illustrating the mechanism for moving the registers to and from the magazine, the parts being in normal position and the register being in the magazine;

Fig. 18 is a perspective view of some of the controls for moving the registers to and from the magazine.

Fig. 19 is a partial detail view of the stop for the register magazine.

Figure 20:
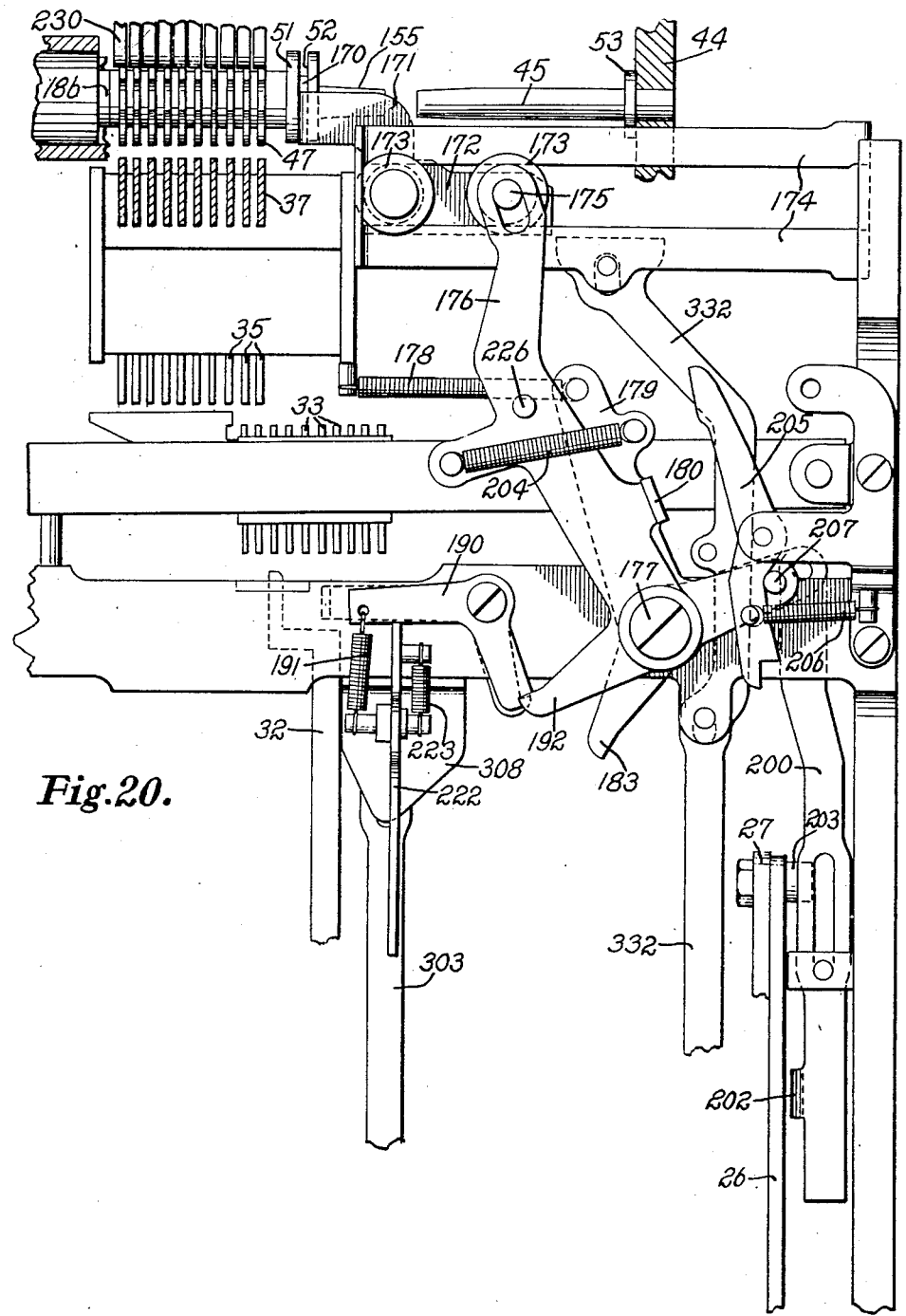
Figure 21:
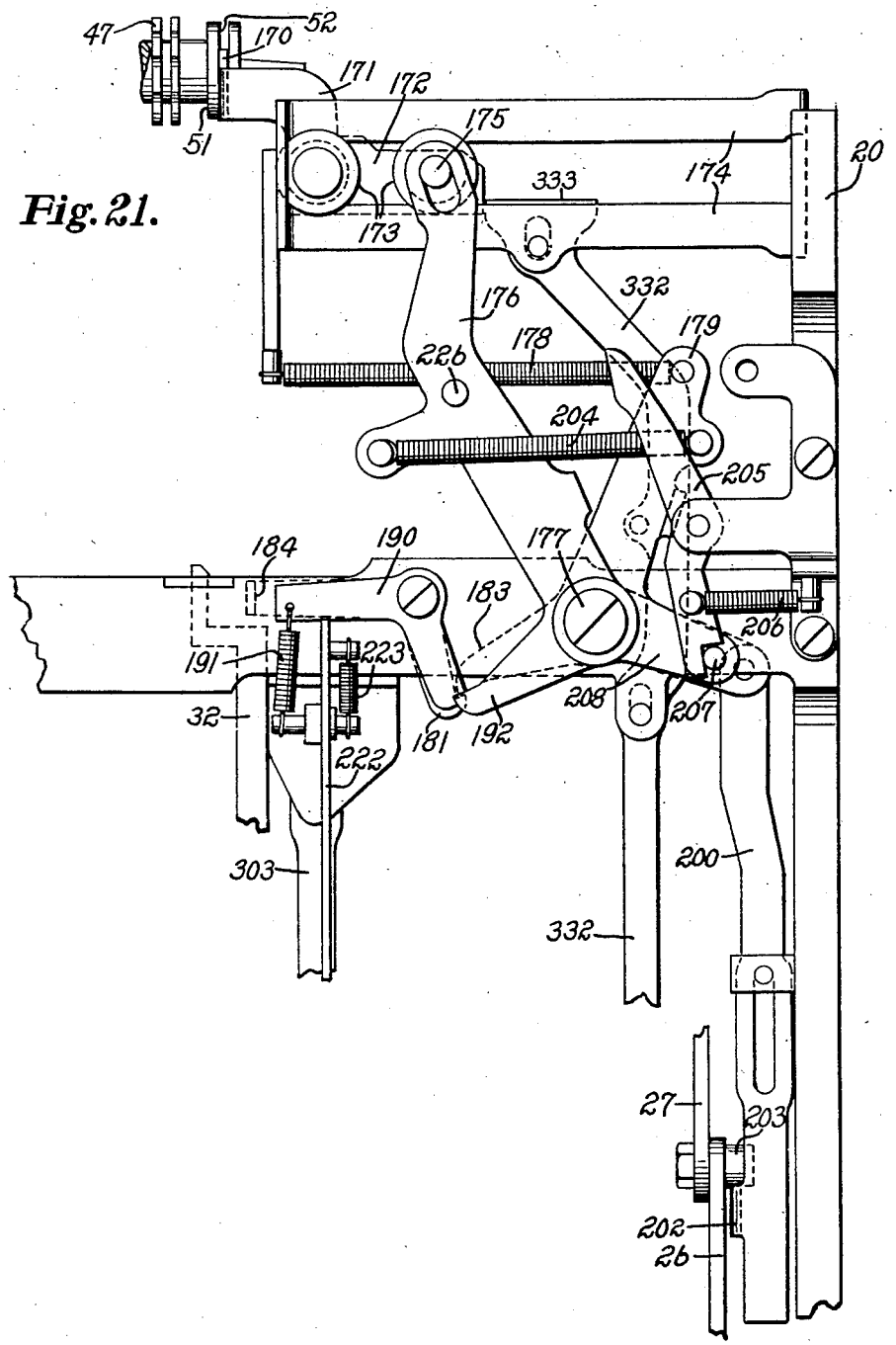

Fig. 20 is a partial front elevation of the mechanism shown in Fig. 17 the view showing the position the parts occupy after a register has been moved from the magazine to the register operating frame;

Fig. 21 is a partial front elevation similar to Fig. 17 showing the position of the parts as they are set to return a register from the operating frame to the magazine;

Fig. 22 is a partial plan view showing particularly the normalizing mechanism by means of which a selected register may be retained in active position during several operations of the machine.

Fig. 23 is a partial left side elevation of the mechanism shown in Fig. 22; and

Fig. 24 is a view similar to Fig. 23 with the parts in latched condition.

The invention is shown applied to a Burroughs billing machine of the type illustrated in Hopkins Patent 1,336,904, it being understood, of course, that the invention can be applied to or used with other calculating machines. The Burroughs machine will be described only briefly, reference being made to the above mentioned patent for details.

Referring to Fig. 1, the machine is provided with a suitable frame 20 on which is mounted a traveling paper carriage C supporting a platen P. The carriage is tabulated laterally across the machine under the control of a taubulating mechanism such as disclosed in Thieme Patent No. 1,259,929, and it is returned by power by mechanism disclosed in Thieme Patent No. 1,294,726.

A motor 21 serves to drive the machine through a clutch mechanism referred to generally as 22 (Fig. 1). The motor and clutch are controlled by starting bars 23 and 24 (Figs. 1 and 3), the bar 23 being the bar that is depressed when an operation without carriage tabulation is desired and the bar 24 being depressed when an operation with carriage tabulation is desired. The control is such that, when one of the starting bars is depressed, the motor rotates a crank 25 through a single revolution after which the crank is automatically stopped. The crank 25 drives the machine through a link 26 connected at its upper end to an arm 27 that is fixed to the main drive shaft 28 of the machine. In an operation of the machine the main drive shaft 28 is first rocked counterclockwise and then returned clockwise to its original position, the counterclockwise movement constituting a "forward" stroke and the clockwise movement constituting a "return" stroke.

Items are entered in the machine by depressing amount keys 30 of which there are ten, the machine being of the ten-key type. When an amount key is depressed, its lever 31 is rocked counterclockwise and a corresponding thrust bar 32 is raised. This thrust bar raises a corresponding pin 33 (Fig. 17) in a pin carriage 34 which travels laterally across the machine under the control of an escapement mechanism, not shown. After an item has been entered on the amount keys, the machine is given a stroke of operation which results in raising the pin carriage 34 bodily and its projected pins, which have been locked in position, elevate pins 35 in a stationary field of pin stops. The operation of the machine also releases a series of spring urged arms 36 (Fig. 1) connected at their upper ends to slidable actuator racks 37. As the actuator racks move forward with the arms 36, they are arrested in differential positions by the engagement of stop shoulders 38 on the racks with the projected pins 35 in the stationary field of stops. After the actuator racks have been differentially positioned the appropriate register is brought into engagement with them and the racks are then returned to normal to enter the item in the registers. The forward ends of the actuator racks carry printing type 39 (Fig. 1) which at the appropriate time are driven into engagement with paper on the platen P to print the amount of the item.

A construction has been developed for enabling a plurality of registers to be used with a machine of this type such construction being shown, for example, in Hopkins 1,366,566. While this construction operates successfully its capacity is not large. The present invention is directed to an improved multiple register feature.

Register magazine

The registers are carried in a magazine which is preferably in the form of a rotatable reel mounted at the side of the group of actuator racks 37. Mechanism is provided for indexing the magazine and for moving the registers to and from the magazine which will be later described.

The magazine comprises a rotatable reel 40 journaled on a stud 41 (Fig. 7) supported in a suitable frame plate 42 attached to the frame 20 of the machine. The reel has an end plate 43 of relatively small diameter adjacent the actuator racks and another end plate 44 of larger diameter. Fixed in the end plate 44 near the periphery thereof and projecting toward the actuator racks are a plurality of pins 45 whose free ends are slightly tapered as shown, for example, at the bottom of Fig. 7. The reel illustrated has twenty pins and is, therefore, a reel of twenty register capacity, but the size of the reel and the number of the pins may, of course, be varied to suit the requirement. The pins 45 carry the registers, each of which constitutes an individual unit such as illustrated in Fig. 6.

Each register unit comprises a sleeve 46 on which are journaled a plurality of register pinions 47 spaced apart by spacing collars 48, the assembly being held in position on the sleeve by two collars 49 and 50. One end of the sleeve 46 has an enlarged collar 51 and this collar has an annular groove 52 in it for purposes that will appear later. It should be noted that the register is an independent, self-contained unit that can be slid on and off the pins 45.

When the register is in position in the magazine on its pin 45, the collar 51 of the register abuts against a flanged portion 53 (Fig. 7) on the pin 45 which flanged portion acts as a limit stop to properly position the register on the pin. The registers are prevented from moving off of the pins 45 by a stationary circular ring 54 (Figs. 4 and 7) supported by the machine frame. This ring is positioned so that it is closely adjacent the ends of the registers but not quite in contact with them so as not to interfere with the easy rotation of the register magazine. The ring 54 is provided with a movable portion or gate 55 (Figs. 4 and 5) pivoted at one end to ring 54 at 56 and provided with a slot in its other end that fits over a stud 57. By swinging the gate upwardly the register that is opposite the gate, as shown in dotted lines in Fig. 5, may be easily removed from its pin 45. This permits easy access to the register for assembly repair, or replacement and it will be noted that it is not necessary to dismantle the magazine or otherwise disconnect complicated parts in order to get at the registers. Each register is an individual unit that can be quickly removed and another substituted.

When the registers are in the magazine their pinions are prevented from rotating by aligning bars 58 (Fig. 4) of which there is one for each register, the bars being securely supported on the reel and the collar 51 of each register being provided with a slot (Fig. 9) permitting it to move over and along the aligning bar for its register.

Figures 7, 8:
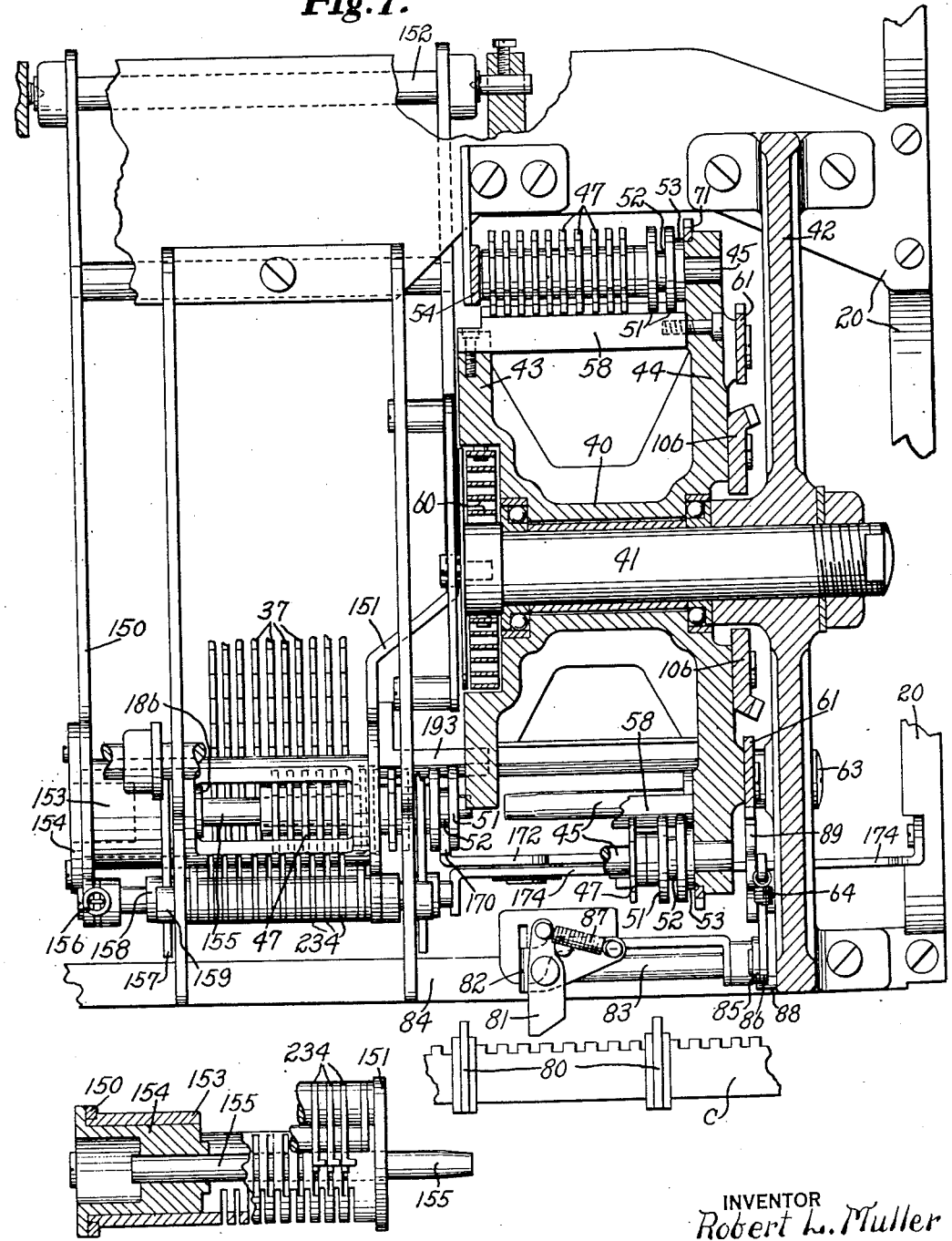
Fig. 7 is a sectional plan view of the register magazine and the register operating frame with a register illustrated partially moved from the magazine to the frame; some of the parts being omitted and others broken away, and the section being substantially on the line 7—7 of Fig. 14.
Fig. 8 is a partial front elevation and section of the register operating frame.

The rotary magazine 40 is urged clockwise in Fig. 1 by a spiral spring 60 (Figs. 4 and 7) fastened at its outer end to the magazine (Fig. 4) and at its inner end to the shaft 41 (Fig. 7). Its rotation in a clockwise direction is governed by an escapement mechanism as follows:

Referring to Figs. 7 and 11, a toothed ratchet disk 61 is fixed to the magazine end plate 44 and, positioned for cooperation with the teeth of the ratchet, is a pawl 62, the latter being pivoted on a stud 63 supported by the stationary frame plate 42 (Fig. 7). The pawl 62 is urged counter-clockwise into engagement with the ratchet disk 61 by a spring 64 connected at one end to a stud 65 on the pawl and at its other end to a lever which will be described later. Engaging over the stud 65 is the slotted end of an arm 66 fixed to the end of a spring returned push rod 67 that extends to the front of the machine as shown in Fig. 1 where it has a key 68 fixed to it. This key is, for convenience, called the magazine indexing key. Depression of key 68 thrusts the rod 67 rearwardly which also moves the arm 66 rearwardly. This rocks the pawl 61 clockwise and releases the ratchet disk 61. The register magazine then moves clockwise, one or more steps under the influence of its spring until the key 68 is released to permit pawl 61 to arrest it, or until the magazine has made a full revolution where it is arrested by the engagement of a stud 69 with the end of an arm 70. In this manner the register magazine may be indexed from its No. 1 to any of its other positions under the control of the indexing key.

In order to prevent a too rapid movement of the magazine a governor is provided. The magazine carries a toothed rack 71 (Fig. 14) meshing with a pinion 72 that drives a centrifugal governor 73. If the magazine should be indexed from one of its early positions to one of its late positions so that quite a movement of the register takes place, the governor acts, whenever the magazine exceeds a predetermined amount, to prevent a too rapid movement and a sudden jar of stopping.

*Carriage control of indexing mechanism*

Provision is made for indexing the register under the control of the paper carriage so that the machine can be set up for certain classes of work and the operator need pay no attention to the indexing of the registers.

Adjustably secured to the paper carriages C are suitable stops 80 (Fig. 14) positioned so as to engage a pass-by pawl 81 (Fig. 7) carried by an arm 82 (Fig. 11) fixed to a shaft 83 journaled in suitable bearings on a cross bar 84 of the machine frame 20. Fixed to shaft 83 is another arm 85 connected to one end of a link 86 urged to the left in Fig. 11 by a spring 87 the movement of the parts to the left being limited by the engagement of arm 85 with a stud 88 in a part of the stationary frame. The other end of link 86 is connected to one end of a lever 89 pivoted on stud 63. Lever 89 has an extension or nose 90 positioned to engage a stud 91 on the pawl 62.

When the carriage moves from left to right, as viewed in Fig. 7, the pass-by pawl 81 is turned against the tension of its spring without any operating effect but, when the carriage moves in the other direction, which is the normal direction of its tabulation, the stop or stops 80 engage the inclined edge of the pass-by pawl and rock the arm 82 rearwardly or clockwise as shown in Fig. 11. This rocks shaft 83 clockwise together with arm 85, and the link 86 is moved to the right which rocks the lever 89 clockwise and the nose 90 acting on stud 91 rocks pawl 62 out of engagement with the ratchet plate 61. This will free the register magazine for rotation under the influence of its spring. Movement of the magazine is limited, however, to one step by a second nose 92 on lever 89 which moves into the path of the ratchet teeth at the time that the pawl 62 is moved out of engagement with the teeth. The operation of this escapement mechanism may be further described as follows:

The stops 80 on the carriage are positioned so that the lever 89 is rocked clockwise momentarily while the carriage moves from one columnar position to another. The momentary rocking of the lever releases the pawl 62 and frees the register magazine which moves a short distance under the influence of its spring 60 until one of the teeth of the ratchet plate engages the nose 92 on lever 89. When the lever 89 is freed by the movement of the carriage stop past the pass-by pawl the spring 87 rocks lever 89 back to normal position which removes nose 92 from the path of the teeth of ratchet and frees the magazine. But this movement of lever 89 urges the pawl 62 toward the ratchet plate and the pawl catches the next tooth of the ratchet plate. The spring 64 that urges the pawl 62 into engagement with the ratchet is connected at one end to a stud on a projection 93 on the lever 89 so that there is a yielding connection between the pawl 62 and the lever 89. The spring 87 is stronger than the spring 64 so that pawl 62 may be moved relative to lever 89 under the control of the key 68 without affecting the carriage controls, but the spring 64 is strong enough so that, when the lever 89 is returned counter-clockwise by the spring 87 during carriage control of indexing, the spring 64 will return the pawl 62 to normal.

Briefly speaking, the carriage controls the escapement mechanism so that the register magazine can be moved one step at a time as the carriage moves from one position to another. The same escapement mechanism can also be controlled by a key so that the register magazine can be stepped around any number of steps at a time from one to twenty, the amount of movement of the magazine depending upon how long the key is held depressed. By means of the key the indexing of the magazine can be started with any one of a large number of registers and the carriage control can thus go forward from any chosen register.

*Restoring mechanism for register magazine*

After the magazine has been moved under the influence of its spring, it is desirable to be able to reverse its direction, either to restore it to its normal No. 1 register position or to move it back to index a register that has already moved past indexing position. Suitable mechanism has been provided for accomplishing this result.

Figures 14, 15:
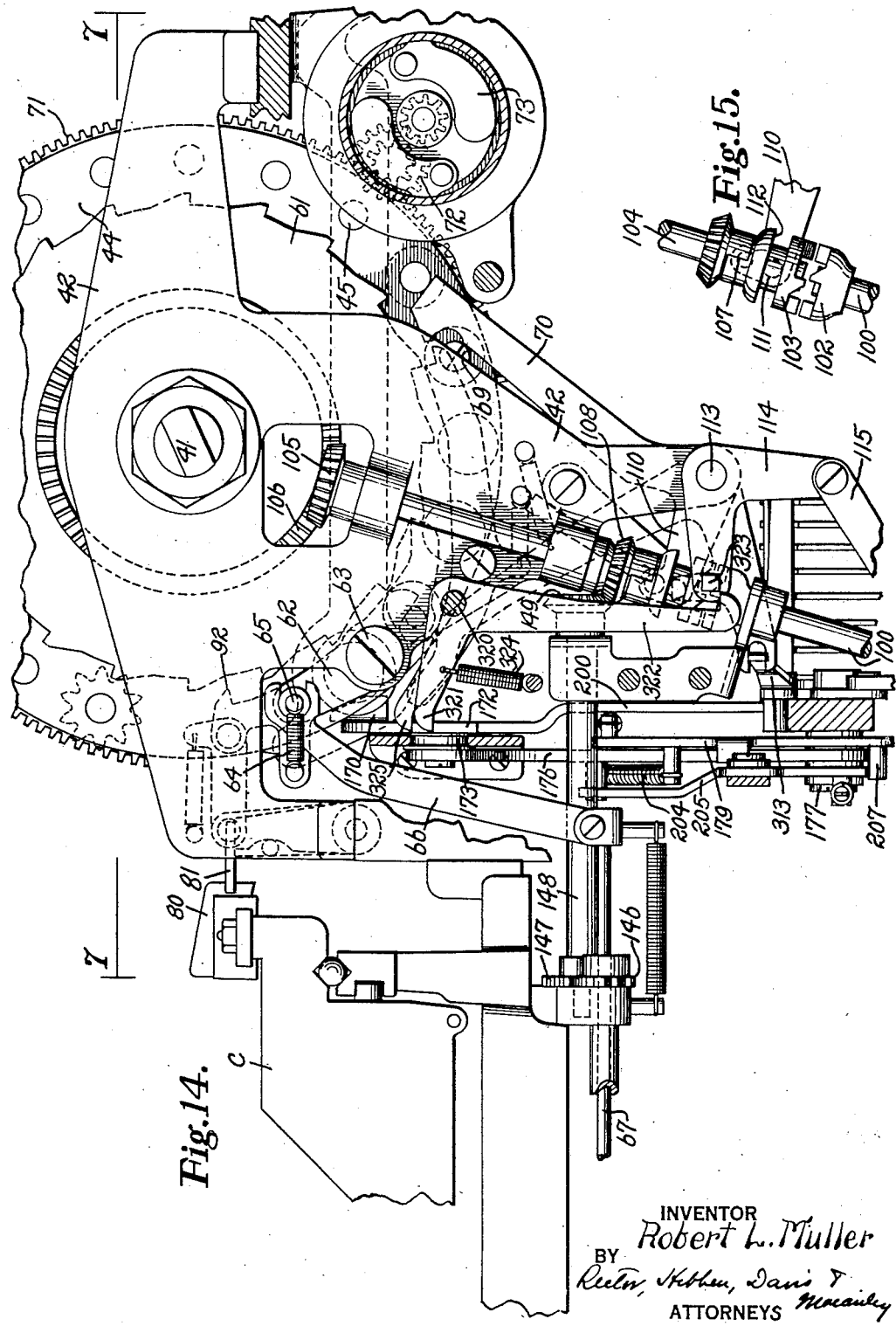
Fig. 14 is a side elevation and section illustrating the mechanism for returning the magazine from indexed position to normal.
Fig. 15 is a detail of the clutch shown in Fig. 14.

Referring to Fig. 1, a shaft 100 supported in diagonal position in bearings on the frame is geared to the motor drive through gearing 101 so that the shaft rotates whenever the motor is rotated. On the upper end of the shaft 100 is a toothed clutch member 102 (Fig. 15). Mounted to cooperate with the clutch member 102 is a complementary member 103 that is slidably mounted on the end of a shaft 104 journaled in the frame plate 42. Shaft 104 carries a bevel gear 105 on its upper end (Fig. 14) that meshes with a bevel gear 106 fixed to the end plate 44 of the register magazine (Fig. 7). The clutch member 103 has a shoulder 107 positioned to engage a complementary shoulder on the hub of a bevel gear 108 fixed to the shaft 104. The shoulder 107 is in engagement with the shoulder on the gear 108 both when the member 103 is in the disengaged position illustrated in Fig. 15 and also when said member is slid downward into engagement with member 102. It will be evident that, when the clutch member 103 is moved downward into engagement with clutch member 102, the gear 108, together with shaft 104, will be rotated to rotate gears 105—106 and the register magazine. The direction of rotation of the shaft 100 is such that the register magazine is rotated counterclockwise as viewed in Fig. 14.

The clutch member 103 is moved into and out of engagement with the member 102 by means of an extension 110 of the arm 70. This extension carries a stud 111 (Fig. 11) positioned in an annular slot 112 in member 103. The arm 70 with its extension 110 is fixed to one end of a shaft 113 and, to the other end of this shaft, is fixed a bell crank lever one arm 114 of which extends downwardly as shown in Fig. 14. A link 115 is connected to bell crank lever arm 114 and the opposite end of link 115 is connected to one arm 116 (Fig. 16) of a bell crank lever pivoted at 117 and having another arm 118 connected to a link 119 that, in turn, is connected to a lever 120 pivoted to the machine frame at 121. The lever 120 is urged clockwise by a spring 122 and it extends to the forward part of the machine (Fig. 1) where it is provided with a key 123 called the "register return" key, its function being to control the return of the register magazine to normal from any of the indexed positions of the latter.

When the register return key 123 is depressed, the link 119 is pulled down, the bell crank 116—118 is rocked clockwise, the link 115 is thrust rearwardly, and the lever 114 with its shaft 113 is rocked counterclockwise thereby rocking the projection 110 of arm 70 counterclockwise and moving the clutch member 103 downward into engagement with clutch member 102 to connect the two shafts 100 and 104 together. Inasmuch as clutch member 102 is constantly being rotated by the motor, the register magazine will thus be rotated counterclockwise as viewed in Fig. 14 until the pressure on the key 123 is relieved whereupon the spring 124 (Fig. 11) acting on projection 110 will disconnect the clutch. The operator may thus stop the return of the register magazine at any point he pleases by releasing key 123 and, in this way, he can turn the register magazine backward to index any desired register.

If pressure on key 123 is not released the clutch is automatically disconnected when the register magazine reaches its No. 1 position by mechanism as follows:

The magazine is provided with a special stud 69 that cooperates with the lever 70. When the magazine is in its No. 1 register position, the stud is against the upper end of lever 70 and the stud blocks counter-clockwise movement of said lever. If an attempt is made to depress key 123 with the parts in this condition, the operator will find the key blocked and he will thereby be notified that the magazine is already in its normal or "home" position.

As the register magazine moves clockwise to index different registers the stud 69 moves away from lever 70 and frees it. As the magazine is returned toward its No. 1 position, this stud 69 engages the inclined face of arm 70 and cams the arm slightly clockwise, thereby rocking the shaft 113 clockwise and swinging the projection 110 with its stud 111 clockwise to disengage the clutch, the clockwise movement of projection 110 being limited by a limit arm 110ᵃ (Fig. 11). The pawl 62 acts to latch the magazine in the position to which it has been moved.

The above described construction enables the operator to return the register magazine at any time he chooses by simply depressing the register return key 123, the extent of the return being optional with the operator and the returning mechanism being automatically disabled whenever the register return key 123 is released or when the magazine reaches its No. 1 position.

*Carriage control of return of register magazine*

In addition to the key control of the return of the register magazine, provision is made for automatically returning the register magazine to its No. 1 register position under the control of the carriage. When the carriage is returned the return of the magazine is effected automatically.

The paper carriage may be returned to starting position under the power of the motor from any of its tabulated positions by depression of the carriage return key 130 shown in Fig. 1, the carriage return mechanism not being shown in the present application, but being fully disclosed in Thieme Patent No. 1,120,862. Key 130 is connected to a lever 131 pivoted to the shaft 121 so that, when the key is depressed, lever 131 is rocked counterclockwise. Connected to lever 131 is a link 132, Fig. 16, which is connected at its upper end to a lever 133 pivoted on the shaft 117. The lever 133 has a lateral lug 134 extending over the edge of the arm 118 of the bell crank lever 116—118. Accordingly, when the carriage return key 130 is depressed, the bell crank lever 116—118 is rocked clockwise by the lever 133 in the same manner as if the register return key 123 had been depressed, and the link 115 is thrust rearwardly to cause the magazine return clutch 102—103 to be engaged to return the register from its indexed position toward its No. 1 position. The link 119 has a slot 135 in its lower end (Fig. 16) so that the above described action can take place without moving the magazine return lever 120.

The carriage return key 130 is generally held down only momentarily and this would often not be sufficient to cause the magazine to be returned to its No. 1 position. In order to insure that the magazine will be completely returned no matter how long the carriage return key is held down, the lever 133 is provided with a square stud 136 (Fig. 16) over which a spring pressed detent 137 is adapted to engage when the lever 133 is swung downwardly by depression of the carriage return key. This detent retains the lever 133 in its lower position so as to maintain the magazine return clutch 102—103 in engagement until the magazine returns to its No. 1 position. As the magazine reaches its No. 1 position the clutch is automatically disengaged as previously explained, the detent 137 yielding to permit the pivoted lever 133 to be rocked upwardly by the positive camming action of the stud 69 on the arm 70 which pushes the link 115 forward.

Register indicator

It is desirable that the operator be able to easily ascertain what register is in indexed position and provision has been made for accomplishing this result.

The indicating mechanism includes a circular plate 140 (Fig. 2) mounted on the frame of the machine at the front. This plate has a series of numbers near its periphery corresponding to the numbers of registers in the magazine. Mounted for movement over the numbers is a pointer 141 fixed to a shaft 142 carrying a gear 143. This gear meshes with another gear 144 on a sleeve 145 that carries a gear 146 on its rear (Fig. 14). The gear 146 meshes with another gear 147 on a shaft 148 that carries a bevel gear 149 at its rear end meshing with the bevel gear 108 on the shaft 104 that is geared to the register magazine. The pointer 141 is thus geared directly with the register magazine and moves with it when the magazine is moved in either direction. When a given register is in indexed position, the pointer is directly over the number corresponding to the indexed register. The operator will thus know at all times what register is in indexed position by glancing at the pointer on the front of the machine.

Register operating frame

As previously explained, the indexed registers are moved to active position relative to the actuator racks by being moved from the magazine into a frame which, for purposes of description in the present application, will be called the "register operating frame".

The frame is located directly over the actuator racks and it includes two side members 150 and 151 (Figs. 7) fixed at their rear ends on a shaft 152 (Fig. 4) pivoted on pintles in bearings on the underside of the top frame of the machine. Mounted between the two side members 150 and 151 toward the front ends thereof is a sleeve 153 (Fig. 8) supporting a bushing 154 in which is fixed a pin 155 the free end of which is tapered and adapted to receive the registers that are moved out of the magazine. The sleeve 153 is cut away at the top (Fig. 8) so as not to interfere with the transfer segments, described later, and is slotted on the underside to permit the rack bars 37 to pass through it (see Fig. 8).

The operating frame is urged upwardly by a spring 156 (Fig. 4) and it normally occupies a position such that, if a register were in it, the register would be out of engagement with the actuator racks 37 and the tapered pin 155 would be in alignment with one of the tapered pins 45 of the register magazine. The frame can be moved downwardly by means of a cam 157 (Fig. 4) operating on a cam roller 158 on the frame and against a stationary stud 159. The cam is controlled by a crank 160 operated by a pitman 161 in a manner described in Hopkins Patent No. 1,336,904 to which reference is made for details. The control is such that the operating frame can be moved to engage the register in it with the actuator racks and disengage it in the proper manner to perform addition, subtraction, total and sub-total taking, and other functions such as described in said Hopkins patent.

The machine also has an independent register 162 (Fig. 4) which is not connected with the multiple register magazine and which is controlled to accumulate grand totals or to perform such other functions as may be desired, said register being described in the Hopkins patent above mentioned.

It will be noted that the operating frame is very light so that very little power is required to move it. When it is moved only one register moves with it. The register magazine is positioned at the side of the frame and at the side of the actuator racks so that a very compact construction can be obtained, the parts being positioned so that the indexed registers can be moved laterally from the magazine into the operating frame.

Mechanism for transferring indexed registers from magazine to operating frame and vice versa After the register magazine is indexed, the indexed register is moved laterally out of the magazine into the operating frame. The frame is then controlled in an appropriate manner to obtain the desired calculation after which the register is automatically returned to the magazine. A mechanism has been provided for quickly and automatically transferring the indexed registers to and from the magazine.

During the indexing movement of the magazine, and as each register moves to its indexed position, the annular slot 52 in the collar 51 of the indexed register moves over a lateral lug 170 (Figs. 9 and 21) on an arm 171 projecting upwardly and laterally from a slidable carriage 172 having a pair of flanged rollers 173 mounted to travel between two spaced rails 174. The carriage 172 has a stud 175 positioned in an elongated slot in the end of a lever 176 journaled loosely on a short shaft 177 supported by the machine frame. In the normal position of the parts shown in Fig. 17, the lever 176 is urged clockwise by a spring 178, one end of which is connected to a stud on the frame of the machine and the other end of which is connected to a stud on the end of a lever 179 fixed on the shaft 177 and provided with a lateral lug 180 (Fig. 18) engaging over the edge of the lever 176.

The arm 176 is normally latched against movement under the influence of spring 178 by a latch 181 (Fig. 18) urged clockwise by a spring 182 so that the nose of the latch is under the end of a lever 183 fixed to the shaft 177. This blocks movement of shaft 177 so that arm 179 cannot move under the influence of spring 179 to move arm 176.

The latch 181 has a relatively long lateral projection 184 (Fig. 18) that extends over the shoulders 185 of all the thrust bars 32 of the levers of the amount keys. When any one of the amount keys is depressed and its thrust bar 32 moved upward, the shoulder 185 of its thrust bar engages the lateral projection 184 of latch 181 and rocks the latch counter-clockwise thereby releasing the arm 183, whereupon the spring 178 snaps the arm 176 clockwise as viewed in Figs. 17 and 18. This movement of arm 176 moves the carriage 172 from left to right in Fig. 17 and quickly transfers or shoots the indexed register from the pin 45 in the register magazine to the pin 155 on the register operating frame, the register abutting against a shoulder or collar 186 (Fig. 17) on the pin 155 which positions the register pinions in alignment with the actuator racks. It will be observed that the register is transferred immediately and instantaneously upon the depression of an amount key, it being immaterial which one of the amount keys is first depressed.

After the lever 176 has been moved by the spring 178 to transfer a register from the magazine to the operating frame, the lever is held in the position to which it is moved by a pivoted latch 190 (Fig. 20) urged counter-clockwise in Fig. 20, or clockwise in Fig. 18, by a spring 191. The latch 190 has a shoulder that moves over the edge of a projection 192 of the arm 176.

Figure 9:
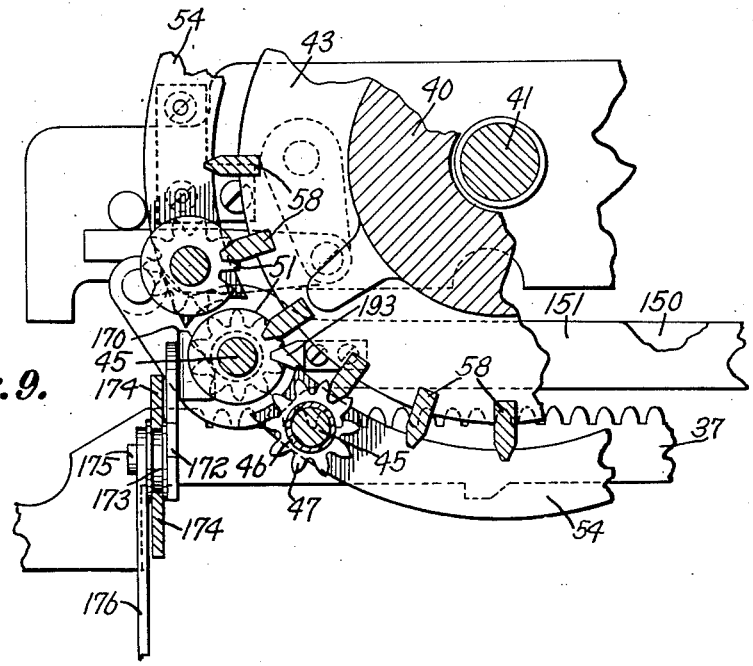
Fig. 9 is a partial side elevation and section of the register magazine, illustrating how the register pinions are kept in alignment.

During the transfer of a register from the magazine to the operating frame it is necessary to have the register pinions kept in alignment. As previously explained, these pinions are kept in alignment in the magazine by means of aligning bars 58 of which there is one for each register. While the registers are moving from the magazine to the operating frame they are kept in alignment by an intermediate aligning bar 193 (Fig. 7) carried by the side arm 151 of the operating frame, which bar bridges the gap between the magazine and the transfer segments on the operating frame. This intermediate aligning bar 193 is offset circumferentially with respect to the aligning bars 58 as shown in Fig. 9. After the register moves into alignment with the transfer segments, the segments prevent rotation of the register pinions until the register is moved out of engagement with the segments and into engagement with the actuator racks during a calculating operation.

After the desired calculating functions have been performed with the register in the operating frame, the frame restores to normal raised position and the register is automatically returned to the register magazine by mechanism as follows:

The lever 183 (Figs. 17 and 18) which is fixed to the shaft 177 is connected to the end of a link 200 guided for vertical movement by a stud 201 on the machine frame which engages a slot in the link. This link has a lateral lug 202 positioned in the path of a stud 203 on the end of the arm 27 (Figs. 1 and 16) which is oscillated during each oscillation of the main drive shaft 28. When the shaft 177 is rocked clockwise in Fig. 17 under the influence of spring 178 the link 200 is raised from the position of Fig. 17 to that of Fig. 20. This raises the lateral lug 202 from the full line position of Fig. 16 to the dot and dash position. When the machine is given a stroke of operation the link 26 (Fig. 16) is drawn downwardly and during the latter part of the forward stroke of the machine, the stud 203 engages the lug 202 and moves it from the dot and dash position of Fig. 16 to the full line position. This pulls the link 200 down and rocks the shaft 177 counter-clockwise as viewed in 17. When this occurs the arm 179 is moved from the position of Fig. 20 to that of Fig. 21 which tensions the spring 178 and a spring 204 connecting the arms 176 and 179. The arm 176 is latched against movement by the latch 190 previously described.

After the arm 179 has moved to its Fig. 21 position it is latched in this position by a pivoted latch 205 pivoted on a bracket of the machine frame and urged counter-clockwise by a spring 206. The latch 205 has a shoulder engaging over a stud 207 on an arm 208 integral with the arm 179. As will be evident from the description just given, the spring 204 is placed under tension tending to draw the arm 176 clockwise as viewed in Fig. 21 or counter-clockwise as viewed in Fig. 17, the direction in which the arm tends to move being the direction for returning a register from the operating frame to the magazine, but immediate movement of the parts is prevented by the latch 190.

During the latter part of the stroke of operation of the machine the latch 190 is released to release the lever 176 which is thereupon snapped clockwise as viewed in Fig. 21 to immediately and instantaneously transfer the register from the operating frame to the register magazine. The means for releasing the latch 191 is as follows:

Fixed to the shaft 28 (Fig. 16) is a plate 210 having a stud 211 on its upper end. This stud is positioned to cooperate with a passby pawl 212 mounted on the end of a lever 213 fixed to a collar that is loose on the shaft 214. During a machine operation the plate 210 is first rocked counter-clockwise and then returned clockwise. During the counter-clockwise movement of the plate the stud 211 passes the passby pawl 212 without having any effect on the lever 213, but during the latter part of the return movement of the plate 210, the stud 211 strikes the passby pawl and rocks the lever 213 clockwise after which the stud passes over the pawl and the lever 213 is returned counter-clockwise to its original position by a spring 215 connected to the left hand end of the lever (Fig. 16) and to a stud on the machine frame. When the lever 213 is rocked clockwise during the latter part of the return stroke of the machine as above explained, a square stud 216 on its left hand end (Fig. 16) moves upwardly and the nose of a latch 217 snaps under the stud by a spring 218. This latch is pivoted on one end of a lever 219 that, in turn, is pivoted at 220 to a stationary bracket member 221 of the machine frame (see Fig. 23). The other end of the lever 219 is connected to a link 222 which projects upwardly under the latch 190, the link 222 being urged downward by a spring 223 (Fig. 16). The operation is as follows:

When the lever 213 is rocked clockwise near the end of the return stroke, the square stud 216 moves upwardly and the latch 217 snaps under it so as to connect lever 219 to lever 213. When lever 213 is released by stud 211 passing beyond passby pawl 212, the spring 215 returns lever 213 counter-clockwise to its original position. Inasmuch as, at that time, lever 219 is latched to lever 213 by latch 217, lever 219 is moved counter-clockwise which pushes link 222 upward and releases latch 190 to release arm 176.

The connection between the lever 213 and lever 219 through latch 217 is disabled after latch 190 has been released. For this purpose, latch 217 is provided with an upward extension having a nose 224 (Fig. 16). As the latch 217 moves down with lever 213 this nose cams against the edge of a plate 225 (Figs. 16 and 22) which causes the latch to be swung clockwise to disconnect it from stud 216. The timing is such that the latch 217 is not disconnected until just after latch 190 is released.

As will be observed, this releasing action of latch 190 takes place during the latter part of a stroke of operation of the machine so that the register is not returned from the operating frame until just at the end of the stroke of operation of the machine and after the necessary calculating functions have been performed.

As the lever 176 moves clockwise as viewed in Fig. 21, a stud 226 on the lever engages the upper end of the latch 205 and rocks it clockwise thereby releasing the stud 207. This releases the lever 179 for the next machine operation. Also the arm 183 moves back counter-clockwise past latch 181 (Figs. 17 and 18) and the arm is relatched in its Fig. 17 position.

To briefly recapitulate upon depression of the first amount key in entering an item the indexed register is automatically and instantaneously transferred laterally from the magazine to the operating frame and the mechanism for transferring the register is latched to hold the register in position. After the item is entered the machine is given a stroke of operation during which time the operating frame is moved to effect the desired calculations. Also, during the machine operation the mechanism for transferring the register is conditioned to return the register to the magazine. Near the end of the machine operation and after the desired calculations have been performed, the register is automatically and instantaneously returned to the magazine and the mechanism for transferring it is conditioned for another operation.

Transfer mechanism

Figure 10:
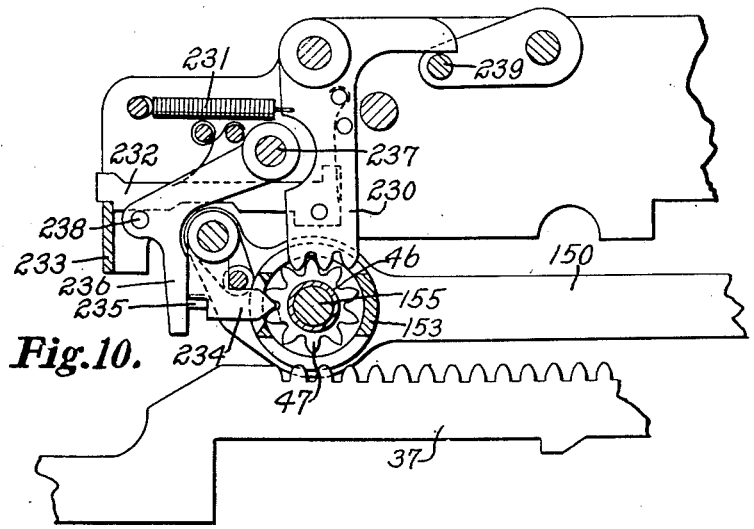
Fig. 10 is a partial right side elevation and section of the register operating frame illustrating how the registers cooperate with the transfer mechanism.

It is, of course, necessary to effect transfers in a register while it is performing calculating operations in the operating frame. For this purpose a single transfer mechanism is used that cooperates with each of the registers. This mechanism, which is of the type described in Hopkins Patent 1,336,904, is partly illustrated in Fig. 10.

It includes transfer segments 230 of which there is one for each pinion, the segments being urged clock-wise by springs 231 but being normally held against movement by latches 232 having shoulders engaging a plate 233. Pivoted pawls 234 are provided having noses positioned so as to be engaged by transfer projections on the register pinions.

Each pawl 234 has a lug 235 positioned to engage an arm 236 pivoted at 237, said arm carrying a stud 238 engaging under the edge of its latch 232. When one of the register pinions passes from its "9" to or through its "0" position its pawl 234 is rocked clockwise as viewed in Fig. 10 which rocks the arm 236 in the same direction and lifts the latch 232 over the edge of the plate 233 whereupon the spring 231 moves the transfer segment 230 to "initial carry" position, the movement of the segment being limited by a bail 239. As the register is moved out of engagement with the actuator racks and into engagement with the transfer segments, the bail 239 is lowered which releases the transfer segments to effect transfers in the register. This transfer mechanism will not be further described as it is described in detail in the Hopkins patent above mentioned.

Normalizing mechanism for retaining registers in operating frame

If it is desired to enter several items in the same register, the entry will occur automatically if the magazine is not indexed to a new position. At each operation of the machine the register will be transferred from the magazine to the operating frame and back again. While this is an entirely feasible operation, provision has also been made for conditioning the mechanism so that when the above mentioned result is desired, the machine can be conditioned so that the register will remain in the operating frame until the desired number of calculations have been performed.

Referring to Fig. 1, the machine is provided with a normalizing bar 240 overlying a portion of the starting bar 23. The normalizing bar is carried by one arm of a bell crank lever 241 connected to a rod 252 whose rear end is connected to a lever 253 pivoted at 254 (Fig. 16). The upper end 255 of lever 253 (Fig. 16) engages one arm 256 (Fig. 22) of a bell crank lever pivoted at 257. The other arm 258 of this bell crank lever is connected to the plate 225 which is slidable and urged to the left in Fig. 22 by a spring 259. The plate has a notch 260 in which the upper end or nose 224 of latch 217 is normally positioned. When the normalizing bar is depressed, the lever 253 is rocked clockwise as viewed in Fig. 16 which rocks the bell crank lever 256—258 clockwise in Fig. 22. This pushes the plate 225 to the right and moves the notch 260 past the nose 224 of latch 217. The cam edge of the notch moves in front of the latch so as to prevent movement of it. As will be recalled, this latch 217 operates to connect the lever 219 to lever 213 in order to release the latch 190 (Fig. 17) to permit the spring 204 to return the register from the operating frame into the magazine. By blocking the latch 217 by the slide 225, the latch 217 is prevented from engaging under the square stud 216, consequently the necessary connection between levers 213 and 219 will not be made and the latch 190 will not be released and the register will not be returned from the operating frame to the magazine at the end of a machine operation.

In order to properly time the above-mentioned parts it is necessary to latch the sliding plate 225 in position momentarily, and, for this purpose, a latch 272 pivoted at 273 on the bracket 221 (Fig. 23) has been provided. This latch is urged to latching position by a spring 274. The latch enters the notch 260 in slide 225 when the slide is moved to the right as viewed in Fig. 22 and holds the slide in its right hand position until near the end of the stroke of operation of the machine when a stud 275 (Fig. 23) on lever 213 acts on the latch. It will be recalled that lever 213 is rocked slightly at the end of a machine. When so rocked the stud 275 on the lever first passes a passby pawl 276 on latch 272 but, upon return movement of lever 213, the stud engages pawl 276 and rocks latch 272 counter-clockwise as viewed in Fig. 23 to thereby release plate 225 which moves back to normal under the influence of its spring 259.

Thus, by depressing the normalizing bar, which also depresses the starting bar, the machine is given a stroke of operation and the register allowed to remain in the operating frame. It will so remain in the frame as long as the normalizing bar is depressed to give the machine its strokes of operation but when the starting bar is depressed separately the register will be automatically returned to the magazine at the end of the machine operation thus initiated.

Control of transfer of registers by total key

If an operator should desire to take a total from any of the registers, it is not desirable to depress an amount key in order to transfer a register from the magazine to the operating frame. Accordingly, provision has been made whereby the registers may be transferred automatically upon depression of the total key.

In the machine with which the invention has been illustrated, the depression of the total key normally moves the register into engagement with the actuator racks and, of course, in total taking this engagement takes place immediately and before the racks move forward. In the present invention, such immediate movement of the register upon depression of the total key would interfere with the transfer of the indexed register from the magazine to the operating frame and hence certain changes in the total controls have been made. Instead of having the register rocked into engagement with the actuator racks by depression of the total key, depression of the total key conditions certain connections so that when the machine is operated the operating frame is immediately rocked to bring the register into engagement with the actuator racks.

Referring to Fig. 1, the total key 280 is connected to a bell crank lever 281 which, in turn, is connected to a link 282 extending rearwardly. At its rear end this link is connected to one arm 283 (Fig. 16) of a bell crank lever pivoted at 284 in a frame bracket. The other arm 285 of the bell crank lever is connected to a link 286 that is connected to one arm 287 of a bell crank lever pivoted on shaft 214. The other arm 288 of this lever is connected to a link 289 which, in turn, is connected to an arm 290 pivoted at 291 to the link 161 that actuates register operating frame. The arm 290 carries a stud 293 adapted to be positioned under the arm 294 of a bell crank lever pivoted at 295. The other arm 296 of this bell crank lever extends downwardly for a considerable distance and is cam-shaped for engagement by a stud 297 on an arm 298 fixed to the main drive shaft 28 of the machine.

When the total key is depressed the bell crank 283—285 is rocked counter-clockwise which pulls down on the link 286 and rocks the bell crank lever 287—288 counter-clockwise. This pulls the link 289 to the left in Fig. 16, and rocks the arm 290 counter-clockwise to position the stud 293 under the arm 294. Upon operation of the machine, the lever 298 rocks counter-clockwise and the stud 297 immediately rocks the bell crank lever 296—294 clockwise. Arm 294 engages stud 293 and moves the link 161 downward which rocks the register operating frame downward to move the register into engagement with the actuator racks. In this manner, depression of the total key conditions the parts so that upon operation of the machine, the register in the operating frame is immediately engaged with the racks. But it is first necessary to get a register in the frame. This is accomplished under control of the total key as follows:

The link 282 (Fig. 16), which is moved forward by depression of the total key, engages one arm 300 of a pivoted yoke 301 having another arm 302 engaging under the end of a vertically movable link 303 suitably guided on the frame. This link extends upwardly and on its upper end it carries a pawl 304 (Fig. 17) positioned under a stud 305 on latch 181. The yoke 301 is urged clockwise by a spring 306 (Fig. 16) but when the total key is depressed, the yoke is rocked counter-clockwise against the tension of this spring and the arm 302 thrusts the link 303 upward. This releases the latch 181 and the indexed register is transferred from the magazine to the operating frame by the spring 178, it being understood that the operator has indexed the magazine before depressing the total key. During the final portion of the upward movement of the link 303 a stud 307 on a stationary bracket 308 (Fig. 17) cams the pawl 304 clockwise thereby releasing the latch 181 and allowing it to return to its original position against its limit stud 309 under the influence of its spring 182. This release of latch 181 is effected because the total key is held down during a considerable portion of the operation of the machine and if the pawl 304 were under the stud 305 for too long a time it might interfere with the relatching of arm 183.

With the mechanism just described, when the total key is depressed, the indexed register is automatically moved into the operating frame and connections are conditioned so that, immediately upon operation of the machine, the register is moved into engagement with the actuator racks to enable a total to be taken.

*Interlocks*

In order to prevent misoperation of the machine, a number of interlocks are provided as follows:

*1. Preventing removal of register from magazine when magazine is not properly indexed*

In order to prevent operation of the mechanism for transferring the registers from the magazine to the operating frame while the magazine is moving between two index positions, or when it is in what may be termed an "in-between position", the following mechanism has been provided.

Referring to Fig. 11, a bell crank lever 310—311 is pivoted on the shaft 113, the lever being urged clockwise by a spring 312. The upper arm 310 of this lever has a V-shaped portion (Figs. 11 and 12) which, when the magazine is in an indexed position, engages the collar 53 (Fig. 12) of one of the pins 45 in the magazine. When the magazine is moving from one indexed position to another, the V-shaped end of arm 310 passes the space between two of the collars 53 and is free to move slightly toward the magazine under the influence of the spring 312. The other arm 311 of the bell crank lever has a bifurcated end straddling one arm 313 of a pivoted bell crank lever (Fig. 17) whose other arm 315 has a hooked end adapted to engage under the end of the arm 183.

When the magazine is in one of its indexed positions, that is, with the pins 45 and 155 in alignment, the V-shaped point of lever 310 will rest on the collar 186, as shown in Fig. 12, and the hooked end of arm 315 will be clear of arm 183, as shown in Fig. 17. However, if the magazine is in an intermediate position as in Fig. 13, the lever 310—311 is rocked clockwise by its spring 312 as viewed in Fig. 11, which rocks the lever 313—315 clockwise in Fig. 17 and positions the hooked end of arm 315 under the arm 183. This prevents movement of the register transferring arm 176 even though the latch 181 is released. Accordingly, as long as the magazine is not properly indexed none of the registers can be moved out of the magazine.

*2. Magazine locked against rotation while register is in operating frame*

When one of the registers has been moved to the operating frame it is, of course, important that the register magazine remain in its indexed position. If it were to be rotated, the register could not be returned to the magazine.

Referring to Fig. 14, a bell crank lever pivoted at 320 to the machine frame has one arm 321 positioned to rest on the carriage 172 that transfers the registers to and from the magazine. The other arm 322 of this lever has a hooked end adapted to engage under a stud 323 on an arm of the bell crank lever 114 that controls the clutch for returning the magazine to normal. The bell crank 321—322 is urged counter-clockwise in Fig. 14 by a spring 324, but movement is normally prevented by the engagement of arm 321 with the top edge of the carriage 172 (Figs. 14 and 17). When a register is transferred to the operating frame the carriage 172 moves to the right as viewed in Fig. 17 which frees arm 321 of the bell crank lever 321—322 which thereupon moves counter-clockwise as viewed in Fig. 14 under the influence of its spring 324 and positions the shoulder on the arm 322 under the stud 323. This prevents counter-clockwise movement of the lever 114 and thereby prevents the clutch 102—103 from being engaged to return the magazine under the power of the motor. Accordingly, as long as a register is in the operating frame the clutch for returning the register magazine cannot be operated.

As will be observed from Fig. 17, the edge of the carriage 172 on which arm 321 rests is beveled so that, upon return of the carriage, the arm 321 will ride up to normal position.

Provision is also made for preventing movement of the magazine under the influence of its spring 60 when a register is in the operating frame.

A lever 325 (Figs. 14 and 11) is provided having a nose resting on the top of the carriage 172. This lever is pivoted at 326 to the magazine supporting frame as shown in Fig. 11 and urged counter-clockwise by a spring 327. The other end of this lever has a notched shoulder 328 adapted to engage the teeth of the ratchet plate 61, but normally held out of their path by the engagement of lever 325 with the top edge of carriage 172. When a register is transferred to the operating frame, the lever 325 is released by movement of carriage 172 to the right in Fig. 17 whereupon the lever is moved counter-clockwise as viewed in Fig. 11 by its spring 327 and its shoulder 328 moved into the path of the teeth of the ratchet plate 61 thereby blocking counter-clockwise rotation of the magazine under the influence of the magazine spring 60.

When the carriage frame 172 returns to home position the cam edge of the carriage 172 restores the lever 325 clockwise to release the ratchet plate 61.

In this manner rotation of the magazine in both directions is prevented by misoperation while a register is in the operating frame.

3. *Preventing operation of machine when register is in intermediate position between magazine and operating frame*

If the machine were given a stroke of operation while one of the registers was in an intermediate position between the magazine and the operating frame, it is evident that something would have to yield or the machine would be damaged. Accordingly, provision is made to prevent depression of the starting bar when a register is in such an intermediate position.

Referring to Figs. 1 and 3, the motor bar 23 is connected by a link 365 to one of the usual clutch operating slides 330 of which there are two immediately adjacent each other. The motor bar 24 is connected by a link 366 to the other clutch operating slide 330. When either of the motor bars is depressed, its respective slide is moved forward and its cammed surface 331 cooperates with a vertically movable link 332, shown in Fig. 17. The upper end of this link has a flat surface 333 adapted to cooperate with the carriage 172 that moves laterally to transfer registers to and from the register magazine. When the carriage is in its left hand position shown in Fig. 17, and when it is in its right hand position shown in Fig. 20, the link 332 may be freely raised because surface 333 is free to pass upwardly beside carriage 172. If the carriage 172 should be in any intermediate position when pressure is put on the starting bar, a portion of the carriage 172 is over the flat upper face 333 of the link 332 and the link cannot be raised. This blocks forward movement of either of the clutch operating bars and prevents depression of either one of the starting bars.

4. *Preventing depression of keys during carriage tabulation*

It will be recalled that the carriage 172 which transfers the registers from the magazine to the operating frame is released by depression of the amount keys. Also, when the indexing of the register magazine is carriage controlled, the magazine is released for movement by a carriage tabulation. An operator might start depressing the amount keys before the carriage had completed its tabulation and before the magazine had completed its indexing movement. While movement of a register from the magazine is prevented by interlock No. 1 above described, when the magazine is not properly indexed, it is desirable to further safeguard the machine against misoperation by preventing depression of the amount keys.

The paper carriage is tabulated by the movement of lever 213, which is moved by stud 211 on plate 210 near the end of a stroke of operation of the machine. The tabulating mechanism details are described in Thieme Patent 1,259,929. The lever 213 carries an adjustable screw 340 (Figs. 16 and 23) positioned to engage a collar 341 (Fig. 23) on a slidable shaft 342 (Fig. 22). The end of the shaft on which the collar 341 is fixed is capable of vertical movement when acted upon by the screw 340 and said shaft is positioned under the hooked end 343 of a slide 344 (Fig. 16) mounted on the frame bracket and urged downward by a spring 344a.

The lower end of the slide 344 is connected to one arm 345 of a pivoted bell crank lever whose other arm 346 is yieldingly connected to a link 347 extending to the front of the machine. Referring to Fig. 1, the front end of the link 347 is connected to one arm of a pivoted bell crank lever 348 having a projection 349 adapted to enter between a series of steel balls 350 contained in a raceway positioned under the amount keys. Each amount key has a projection adapted to enter between the balls, the arrangement being that only one projection may enter at a time. When one projection has entered, the normal space between the balls is closed up so that no other key can be depressed. This is a familiar type of key interlock and a detailed description is not necessary.

When a carriage tabulation takes place, the lever 213 is rocked which raises link 344 by shaft 342 and rocks the bell crank 345—346 counter-clockwise and pushes link 347 forward. This rocks bell crank 348 counter-clockwise and the projection 349 enters between the balls 350 so that none of the amount keys can be depressed.

When the machine is operated in a non-tabulating manner, depression of the non-tabulating starting bar 23 causes the collar 341 and its shaft 342 to be shifted laterally out of the path of the adjustable screw 340 by connections that are not shown.

The front total key and the other result keys are locked during carriage tabulation as follows:

The forward extension of the bell crank lever 348 moves into the path of a vertical extension of a slide plate shown roughly in Fig. 1, this plate being a regular feature on machines of this type. Normally, when the front total key 280, or others of the result keys are depressed, the slide plate 351 is cammed laterally, but when the extension of lever 348 is moved into the path of the vertical projection of slide 351, said extension blocks movement of the slide plate and, consequently, if an attempt is made to depress the front total key, or other result keys, with the machine in this condition, the bell crank levers associated with said keys will be blocked from downward movement by engaging on top of vertical extensions on the slide plate located at the left hand end of the slide, whereas, if the slide plate was not blocked, the bell crank levers of the front total key and other result keys could move downward by camming the slide plate to the right.

5. *Preventing depression of starting bars during carriage tabulation*

It is also undesirable to have the machine given a stroke of operation while the carriage is tabulating and while the magazine is moving from one indexed position to another. To prevent this, mechanism has been provided to prevent depression of either of the starting bars 23 or 24.

The starting bar 23 (Fig. 1) is provided with a projection 352 that is adapted to move between the balls 350 that form the interlock just described. When a carriage tabulation takes place, the projection 349 on lever 348 moves between the balls 350 as previously explained and, when this occurs, the projection 352 on the starting bar lever cannot enter. Accordingly, the starting bar cannot be depressed during a carriage tabulation.

The same thing applies to the tabulating starting bar 24 (Fig. 3). It has a projection 353 on its lever 354 which is controlled by the balls 350.

6. *Preventing depression of amount keys, total key, and starting bars during return of register magazine*

While the register magazine is being returned under the power of the motor it is not desirable to have the mechanism for transferring the registers from the magazine released by the amount keys or total key, or the machine to be given a stroke of operation. Accordingly, provision is made to lock the amount keys, the total key, and the starting bars against depression while the register magazine is being returned.

Referring to Fig. 16, the link 344 that controls the bell crank 345—346 and the interlock for the amount keys, the total key and the starting bars, is provided with a stud 360 positioned over the edge of one arm 361 of a yoke 362 pivoted on shaft 254. The other arm 363 of this yoke is positioned under a stud 364 on the link 119. It will be recalled that link 119 is moved downward by depression of the register return key and by depression of the carriage return key, both of which keys cause the magazine to be returned. When link 119 moves downward its stud 364 rocks yoke 362 clockwise and arm 361 acting on stud 360 raises the link 344. This rocks bell crank 345—346 counter-clockwise and pushes link 347 forward to cause projection 349 (Fig. 1) on bell crank 348 to enter between the balls 350 to lock the amount keys, the total key, the result keys, and the starting bars against depression.

Operation

The machine may be operated in a number of different ways, but a brief description of the more usual operations will serve to promote a clearer understanding of the machine.

Assume that the register magazine is in its No. 1 position and that an operator desires to enter an item in one of the registers, for example, register No. 15. He first depresses the magazine indexing key 68 and watches the pointer 141. When the pointer gets around to its No. 15 position he releases the key and the magazine is indexed. Very little practice is needed to stop the pointer in exactly the right position. If it should run past the correct position the register magazine can be returned by depressing the register return key 123 and holding it depressed long enough to return the No. 15 register to the indexed position.

With the register magazine properly indexed the operator enters the item on the amount keys 30. The first amount key depressed releases the register transferring mechanism and the indexed register is automatically and instantaneously moved completely out of the magazine laterally and into the operating frame. After the proper amount keys are depressed, the operator gives the machine a stroke of operation by depressing one of the starting bars. The operation of the machine enters the item in the register and, near the end of the machine operation, the register is automatically returned to the magazine.

The operator may then index the magazine to any other desired position either forward or backward and the operation can be repeated.

If he should desire to enter another item in the same register all that he needs to do is to depress the amount keys whereupon the same register will be again transferred to the operating frame to receive the item. He may then depress the starting bar and the item will be entered in the register after which the register will again be returned to the magazine.

If, when he enters the first item, the operator knows that he wants the second item entered in the same register he can depress the normalizing bar 240 when he wants to give the machine its first stroke of operation. This will condition the mechanism so that the register will not be returned to the magazine at the end of the operation, but will remain in the operating frame in position to receive the second item.

After the paper carriage has traveled across the machine either to the limit of its movement to the left or to an intermediate position from which it is desired to return it to the right, the operator depresses the carriage return key 130 whereupon the carriage is automatically returned and, at the same time, the register magazine is returned to its No. 1 position, the return of the carriage and of the magazine being initiated by depression of the same key, but each returning to its normal position independently of the other.

If the operator desires to take a total from any of the registers he indexes the magazine as above described and then depresses the total key 280 whereupon the indexed register will be transferred to the operating frame and, upon operation of the machine, a total will be taken and the register automatically returned to the magazine.

When the machine is used for work in which items in given columnar positions of the carriage are to be entered in given registers, the control of the indexing of the magazine can be placed under the control of the paper carriage and the operator need pay no attention to the indexing. For example, if the entries start with the register magazine in its No. 1 position and the paper carriage in its first columnar position, the operator depresses the amount keys and the first item will be entered in No. 1 register and printed in the first column on the paper. When the carriage tabulates to its next position the register magazine is automatically indexed to bring the No. 2 register into position. The operator then enters the next item on the amount keys and gives the machine a stroke of operation. This item will go into the No. 2 register and be printed in the second column on the paper. Entries may be thus made in any desired columns by providing the proper stops on the carriage and upon the return of the carriage to the right after it is moved laterally across the machine to a given position, the magazine will be returned to its No. 1 position and the operation can be repeated. All that the operator needs to do is to enter the different amounts on the amount keys and depress the starting bar.

Subtraction may be performed in each of the registers by a process of complemental addition and in a way that is fully described in Hopkins Patent 1,336,904. Multiplication may likewise be performed. Totals may be taken from each of the registers and a total may be also taken from the extra register 162 shown in Fig. 4.

It is, of course, to be understood that the manual control of the register magazine may be combined with the automatic control so that a variety of results can be obtained depending upon what the work requires.

I claim:

1. A calculating machine having actuator racks, a transfer mechanism, a register magazine, a plurality of registers in said magazine, each of said registers comprising a plurality of rotatable pinions, means for indexing said magazine to selectively bring the registers to indexed position, register moving means for completely removing the indexed register from said magazine and moving it to active position for cooperation with said actuator racks and said transfer mechanism to enable a calculating operation to be performed in said register, said register moving means including portions acting to automatically move said register out of active position with respect to said racks and transfer mechanism after a calculating operation has been completed.

2. A calculating machine having actuator racks, a transfer mechanism, a register magazine, a plurality of registers in said magazine, each of said registers comprising a plurality of rotatable pinions, means for indexing said magazine to selectively move the registers to indexed position, and register moving means for completely removing the indexed register from said magazine to position for cooperation with said actuator racks and transfer mechanism to enable a calculating operation to be performed in said register, said register moving means including portions acting to automatically return said register to said magazine after a calculating operation has been completed.

3. A calculating machine having actuator racks, a transfer mechanism, a register magazine, a plurality of registers in said magazine, each of said registers comprising a plurality of rotatable pinions, means for indexing said magazine to selectively move the registers to indexed position, means for moving the indexed register in the direction of its longitudinal axis to move it into position for cooperation with said actuator racks and transfer mechanism to enable a calculating operation to be performed in said register, and means for moving said register out of active position with respect to said racks and transfer mechanism after a calculating operation has been completed.

4. A calculating machine having actuator racks, a rotatable register magazine, a plurality of registers in said magazine, means for indexing the magazine to selectively move the registers to indexed position, and means for moving the indexed register in a line substantially parallel to the axis of the magazine to move said register into active position relative to the actuator racks for a calculating operation.

5. A calculating machine having actuator racks, a register magazine, a plurality of registers in said magazine, each of said registers comprising a plurality of rotatable pinions, a movable register receiving frame for receiving registers from said magazine, means for indexing said magazine to selectively move the registers to indexed positions relative to said receiving frame, register moving means for moving the indexed register from said magazine to said receiving frame, and means operating automatically during a machine operation to move said receiving frame to cause an engagement between the register therein and said racks for a calculating operation, said register moving means including portions acting to automatically return said register from said frame to said magazine after a calculation has been performed.

6. A calculating machine having actuator racks, an operating frame for moving registers into and out of engagement with said actuator racks, a register magazine, a plurality of registers in said magazine, means for indexing said magazine to selectively position the registers relative to said frame, and means for moving the indexed register from said magazine to said frame and for returning said register from said frame to said magazine.

7. A calculating machine having actuator racks, a rotary register magazine mounted at the side of said racks, a plurality of registers in said magazine, means for indexing the magazine to selectively move the registers to indexed position, a register operating frame positioned adjacent said actuator racks, and means for moving the indexed register laterally from said magazine into said operating frame for a calculating operation, said last-named means also acting automatically to return the register to the magazine after the calculating operation has been performed.

8. A calculating machine having actuator racks and amount keys, a register magazine, a plurality of registers in said magazine, means for indexing said magazine to selectively move the registers to indexed position, and means controlled by said amount keys acting to automatically move the indexed register into operating position relative to said actuator racks for a calculating operation.

9. A calculating machine having amount keys and actuator racks, a register magazine, a plurality of registers in said magazine, means for indexing said magazine to selectively move the registers to indexed position, and means acting automatically upon depression of any of the amount keys to move the indexed register to active position relative to the actuator racks for a calculating operation, said latter means having provisions for automatically returning said register to its normal position after the calculating operation has been completed.

10. A calculating machine having amount keys and actuator racks, a register magazine, a plurality of registers in said magazine, means for indexing the magazine to selectively move the registers to indexed position, and means acting automatically upon depression of any of the amount keys for moving the indexed register relative to said magazine to place it in active position relative to said actuator racks for a calculating operation, said last-named means having provisions for automatically returning the register upon completion of the calculating operation.

11. A calculating machine having amount keys and actuator racks, a rotary register magazine, a plurality of registers in said magazine, means for indexing the magazine to selectively move the registers to indexed position, and means acting automatically upon depression of any of the amount keys to move the indexed register laterally from said magazine to active position relative to said actuator racks for a calculating operation, said last-named means acting automatically to return said register to the magazine after said calculating operation has been completed.

12. A calculating machine having an operating means, actuator racks, amount keys, a magazine containing a plurality of registers, means for indexing said magazine to selectively move registers to indexed position, spring-operated means controlled by said amount keys and acting when a key is depressed to move the indexed register from the magazine into operative position relative to said actuator racks, and spring means energized by said operating means during a machine operation acting to autmoatically return said register to said magazine after said machine operation.

13. A calculating machine having amount keys, actuator racks, a magazine containing a plurality of registers, an operating frame for moving registers into and out of engagement with said actuator racks, means for indexing said magazine to selectively position the registers relative to said frame, means controlled by said amount keys acting automatically to move a selected register from said magazine to said frame for a calculating operation, and means acting automatically at the end of said calculating operation to return said register from said frame to said magazine.

14. A calculating machine having an operating means, amount keys, actuator racks, an operating frame for moving registers into and out of engagement with said actuator racks, a rotatable magazine containing a plurality of registers, said magazines being positioned at the side of said operating frame, means for indexing said magazine to selectively move the registers to indexed position, spring-operated means released by said amount keys acting to move an indexed register laterally from said magazine to said frame for a machine operation, and spring means energized by said operating means during the latter part of the machine operation for returning said register laterally from said frame to said magazine.

15. A calculating machine having a keyboard and actuator racks, a rotary register magazine containing a plurality of registers, means for indexing the magazine to selectively move the registers to indexed position, a laterally movable register carriage having portions engaging each register as the register moves to indexed position, said carriage being urged in a direction to remove the indexed register from the magazine but being normally latched against such movement, connections controlled by keys on the keyboard for releasing said carriage to enable it to move the indexed register from the magazine to active position relative to the actuator racks, means for latching the carriage in the position to which it is moved, spring means tensioned by operation of the machine tending to move said carriage back toward said magazine, and means operated by the machine near the latter part of a stroke of operation thereof for releasing said carriage to permit it to return the register to the magazine.

16. A calculating machine having actuator racks, a total taking means, a register magazine, a plurality of registers in said magazine normally out of active position relative to said actuator racks, means for indexing said magazine to selectively move the registers to indexed position, means controlled by said total taking means acting automatically, as said total taking means is conditioned for total taking, to move the indexed register from said magazine to a position for co-operation with said actuator racks, and means for moving said removed register into and out of engagement with said racks to take a total, said register moving means having portions acting to automatically return said register to said magazine after said total has been taken.

17. A calculating machine having actuator racks, a total taking means, a register magazine, a plurality of registers in said magazine normally out of active position relative to said actuator racks, means for indexing said magazine to selectively move the registers to indexed position, a register receiving frame, register moving means controlled by said total taking means acting automatically, as said total taking means is conditioned for total taking, to move the indexed register from said magazine to said receiving frame, and means for moving said frame to engage the register in it with said racks for a total taking operation, said register moving means including portions acting automatically to return said register to said magazine after a total has been taken.

18. A calculating machine having actuator racks and a total key, a rotary register magazine, a plurality of registers in said magazine normally out of active position relative to said actuator racks, means for indexing the magazine to move desired registers to indexed position, and means acting automatically upon depression of the total key to move the indexed register laterally out of said magazine to active position relative to said actuator racks for a totaling operation, said latter means also acting automatically to return the register to the magazine after the totaling operation has been completed.

19. A calculating machine having actuator racks, a register magazine comprising a rotary reel having a plurality of laterally positioned pins near its periphery adapted to receive registers, the ends of the pins at one side of the drum being free, and an annular plate positioned adjacent the free ends of said pins to hold the registers thereon, said plate having an opening at one portion thereof through which registers may be moved laterally to operative position relative to the actuator racks.

20. A calculating machine having a register magazine comprising a rotary reel having a plurality of laterally positioned pins near its periphery, said pins being attached to one end of said reel and their other ends being free, registers on said pins, a stationary annular plate positioned adjacent the free ends of said pins to hold the registers thereon, said plate having an opening therein to permit registers that are indexed relative to said opening to be removed laterally from said magazine, aligning means on said reel for each of said registers to prevent accidental rotation of the register pinions, and an aligning means adjacent the opening in said plate to prevent rotation of the pinions of each register as it is moved laterally out of the magazine.

21. A calculating machine having actuator racks, a register magazine containing a plurality of registers, each register comprising a plurality of pinions mounted on a sleeve slidably mounted on pins in said magazine, an operating frame having pins to receive said registers, means for selectively moving the registers from said magazine pins to the pins on said operating frame, and means for moving said frame to engage and disengage the registers and the actuator racks.

22. In a calculating machine, a register magazine containing a plurality of pins for the receipt of registers, and registers mounted on said pins, each of said registers comprising a self-contained unit consisting of a sleeve adapted to fit over said pins, a plurality of register pinions rotatably mounted in spaced relation on said sleeve, and means on each end of the sleeve to hold the pinions against longitudinal movement so that each register constitutes an operable assembled unit when removed from the magazine.

23. In a calculating machine, a rotary register magazine having pins for the receipt of registers, registers on said pins, each register consisting of a self-contained unit comprising a sleeve adapted to fit on said pins, a plurality of register pinions rotatably mounted in spaced relation on said sleeve with means on each end of the sleeve to hold the pinions against longitudinal movement, and a stationary annular ring for holding said registers on said pins while they are in said magazine, said ring having a portion movable to permit the register opposite it to be removed from its pin.

24. A calculating machine having a traveling paper carriage movable across the machine in a given direction, a carriage return mechanism, a register magazine, a plurality of registers in said magazine, means for moving said magazine away from a normal position to a plurality of indexed positions for indexing the registers for operation, and means conditioned as an incident to the enablement of said carriage return mechanism acting automatically to return said register magazine to its normal position independently of the return of said paper carriage by said carriage return mechanism.

25. A calculating machine having a keyboard and a traveling paper carriage adapted to be returned across the machine, a register magazine, a plurality of registers in said magazine, means controlled by the carriage for indexing said magazine to selectively move the registers to positions away from a normal position, and automatic means controlled by a member on the keyboard for returning said magazine to normal independently of the position of the paper carriage or its return movement.

26. A calculating machine having a traveling paper carriage, a register magazine containing a plurality of registers, means urging said magazine in an indexing direction, escapement mechanism controlled by said paper carriage for governing the step by step movement of said magazine, and a key control for said escapement mechanism for governing it so that the magazine may be indexed any desired number of steps whereby the carriage control may begin in any desired indexed position of said magazine.

27. In a calculating machine having a traveling paper carriage and a power operated carriage return mechanism, a rotary register magazine, a plurality of registers in said magazine, means urging said magazine away from a normal position toward indexed positions, mechanism controlled by said carriage to index said register, and power operated means conditioned automatically as said carriage return mechanism is set into operation acting directly on said magazine to automatically return it to normal position against the tension of said urging means and independently of said paper carriage.

28. In a calculating machine having a traveling paper carriage and a power operated carriage return mechanism with a carriage return key adapted to be momentarily depressed to set said return mechanism into operation, a rotatable register magazine containing a plurality of registers, said magazine normally occupying a given position but being movable away therefrom to indexed positions, means for indexing said magazine, and power operated means conditioned by the momentary depression of said carriage return key for returning said register magazine to normal from any of its indexed positions and independently of said carriage, said magazine returning means including portions causing it to continue to operate after said key has been released and until said register magazine is completely returned to normal.

29. A calculating machine having a register magazine containing a plurality of registers, power means for moving said magazine in a given direction away from its normal position, indexing means for indexing the magazine as it moves in said direction, power operated means for returning said magazine in the opposite direction, and key controlled mechanism for controlling said power operated returning means so that said magazine may be stopped in any of its indexed positions while it is being returned toward normal.

30. A calculating machine having a rotatable register magazine containing a plurality of registers, a spring urging said magazine to rotate away from its normal position, indexing means for indexing said magazine as it rotates under the influence of said spring, power operated means for rotating said magazine in the opposite direction to return it to normal, and a key and connections for controlling said power operated means so that said magazine may be stopped in any of its indexed positions during its return movement.

31. A calculating machine having a rotatable register magazine containing a plurality of registers, a spring urging said magazine to rotate in a given direction away from its normal position, means for indexing said magazine when moved in said direction, power operated means for returning said magazine in the opposite direction, a key and connections for controlling said power operated mechanism so that said mechanism operates while said key is held depressed and stops upon release of said key whereby said magazine may be optionally stopped in any indexed position while it is being returned, and means operating to automatically disable said power operated means when said magazine reaches its normal position while said key is held depressed.

32. A calculating machine having a rotatable register magazine containing a plurality of registers, means for rotating said magazine in a given direction, indexing means for said magazine, and a single depressible key and connections for conditioning said indexing means to enable said magazine to move through its indexed positions in a continuous manner as long as said key is depressed and to be arrested when said key is released, whereby said magazine may be quickly moved to any indexed position without stopping at intermediate index positions.

33. A calculating machine having actuator racks, a register magazine, a plurality of registers in said magazine, means for indexing said magazine to selectively bring the registers to indexed position, register removing means for completely removing the indexed register from said magazine and moving it to active position relative to said actuator racks for a calculating operation, said removing means including portions acting to automatically return said register to said magazine after each calculating operation, and mechanism for conditioning said removing means to cause said register to remain in active position at the end of a machine operation whereby an optional number of calculations may be performed with said register before it is returned to said magazine.

34. A calculating machine having actuator racks, a motor operated driving means, a register magazine, a plurality of registers in said magazine, means for indexing said magazine to selectively bring the registers to indexed position, register removing means for completely removing the indexed register from said magazine and moving it into active position relative to said actuator racks for a calculating operation, said removing means having portions acting to automatically return said register to said magazine after each machine operation, and a special controlling means for setting said driving means into operation, said controlling means having connections for conditioning said removing means to cause said register to remain in active position at the end of a machine operation whereby, by manipulation of said special controlling means, an optional number of calculations may be performed with said register before it is returned to said magazine.

35. A calculating machine having a traveling paper carriage, a register magazine, a plurality of registers in said magazine, power operated means for moving said magazine in a given direction, an indexing means for said magazine normally controlled by said paper carriage, and a key and connections for controlling said indexing mechanism to index said magazine independently of said carriage.

36. A calculating machine having a traveling paper carriage, a rotatable register magazine, a plurality of registers in said magazine, power operated means for rotating said magazine in a given direction, indexing means for said magazine normally controlled by movements of said paper carriage, and a key and connections for controlling said indexing mechanism while said carriage remains stationary whereby said magazine is placed under the control of said key.

37. A calculating machine having a traveling paper carriage provided with a carriage return mechanism, a register magazine, a plurality of registers in said magazine, power operated means for moving said magazine in a given direction, indexing means for said magazine normally under the control of said paper carriage, a key and connections for controlling said indexing mechanism to index said magazine independently of said carriage while said magazine is moving in said given direction, power operated means for returning said magazine in the opposite direction independently of said carriage, and a second key and connections for controlling said returning means to index said register during its return movement.

38. A calculating machine having a register magazine, a plurality of registers in said magazine, power operated means acting directly on said magazine to move it away from a normal position toward indexed positions and for returning it to normal, indexing mechanism for said magazine, and means controlling said indexing mechanism to enable said magazine to be indexed in either direction from any position other than its normal position.

39. A calculating machine having a traveling paper carriage, a register magazine, a plurality of registers in said magazine, power operated means acting independently of said carriage for moving said magazine away from a normal position and for returning it to normal, an indexing mechanism for said magazine normally controlled by said carriage, and means for controlling said indexing mechanism to index said register independently of said carriage in either direction from any of the indexed positions of said magazine other than its normal position.

40. A calculating machine having a traveling paper carriage, a rotary register magazine, a plurality of registers in said magazine, a spring urging said magazine to rotate from its normal postion in a given direction, an escapement mechanism under the control of said paper carriage to index said magazine step by step as said carriage is moved from column to column, a power operated driving means for returning said magazine, a normally disconnected clutch between said driving means and said magazine, and means for engaging said clutch to cause said driving means to return said magazine to normal against the tension of said spring.

41. A calculating machine having a traveling paper carriage, a rotary register magazine, a plurality of registers in said magazine, a spring urging said magazine to rotate in a given direction from its normal position, an escapement mechanism normally under the control of said paper carriage for indexing said magazine step by step as said carriage moves from column to column, a key and connections for controlling said escapement mechanism to index said magazine independent of said carriage, a power returning means for said magazine, a normally disconnected clutch between said power returning means and said magazine, a key and connections for engaging said clutch for an optional length of time whereby said magazine may be returned against the tension of said spring to any indexed position or to normal, and means automatically disengaging said clutch when said magazine reaches its normal position.

42. A calculating machine having a traveling paper carriage, a register magazine, a plurality of registers in said magazine, power means for moving said magazine to indexed positions, indexing means controlled by said carriage for normally indexing said magazine in a given position in each columnar position of said carriage, and key controlled means operable in each columnar position of said carriage while said carriage remains in its columnar position for controlling said indexing means to index said magazine to any of its index positions other than that for which it is normally indexed by the carriage in said columnar position.

ROBERT L. MULLER.